(12) United States Patent  
Yun et al.

(10) Patent No.: US 10,209,915 B2  
(45) Date of Patent: Feb. 19, 2019

(54) ELECTRONIC DEVICE AND FILE READ AND WRITE METHOD THEREOF

(71) Applicant: Samsung Electronics Co., Ltd., Gyeonggi-do (KR)

(72) Inventors: Sung Hwan Yun, Gyeonggi-do (KR); Woo Joong Lee, Seoul (KR); Sei Jin Kim, Gyeonggi-do (KR); Min Jung Kim, Gyeonggi-do (KR); Jong Min Kim, Gyeonggi-do (KR); Sung Jong Seo, Gyeonggi-do (KR); Jun Beom Yeom, Gyeonggi-do (KR); Sang Woo Lee, Gyeonggi-do (KR); Jong Woo Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 15/099,503

(22) Filed: Apr. 14, 2016

(65) Prior Publication Data

US 2016/0306583 A1 Oct. 20, 2016

(30) Foreign Application Priority Data

Apr. 14, 2015 (KR) .................. 10-2015-0052221

(51) Int. Cl.
*G06F 3/06* (2006.01)
(52) U.S. Cl.
CPC .......... *G06F 3/0643* (2013.01); *G06F 3/0608* (2013.01); *G06F 3/0679* (2013.01)

(58) Field of Classification Search
None
See application file for complete search history.

(56) References Cited

U.S. PATENT DOCUMENTS

| 7,814,474 B2 | 10/2010 | Chen et al. | |
| 2006/0190939 A1 | 8/2006 | Chen et al. | |
| 2012/0110328 A1* | 5/2012 | Pate | G06F 21/6218 713/165 |
| 2012/0173595 A1* | 7/2012 | Salters | G06F 17/30227 707/822 |
| 2012/0210066 A1* | 8/2012 | Joshi | G06F 12/0866 711/118 |

(Continued)

FOREIGN PATENT DOCUMENTS

| KR | 10-2013-0050664 A | 5/2013 | |
| WO | WO-2015066980 A1 * | 5/2015 | .......... H03M 7/3091 |

*Primary Examiner* — Tracy C. Chan

(57) ABSTRACT

An electronic device is provided. The electronic device includes at least one first memory being nonvolatile and a processor configured to read a file from the first memory or to write a file on the first memory. The first memory stores instructions, the instructions, when executed, causing the processor to provide a software layer structure including a first virtual file system layer configured to interface with an application program layer, a compressed file system layer configured to compress at least a part of data of the written file or to decompress at least a part of data of the read file, a second virtual file system layer configured to manage the written or read file, and a first file system layer configured to read at least a part of the file from the first memory or to write at least a part of the file on the first memory.

19 Claims, 14 Drawing Sheets

(56) References Cited

U.S. PATENT DOCUMENTS

| | | | |
|---|---|---|---|
| 2012/0221744 A1* | 8/2012 | Heywood | G06F 9/4862 709/247 |
| 2013/0117579 A1* | 5/2013 | Ham | G06F 21/602 713/193 |
| 2015/0161155 A1* | 6/2015 | Pletcher | G06F 3/0643 707/693 |

* cited by examiner

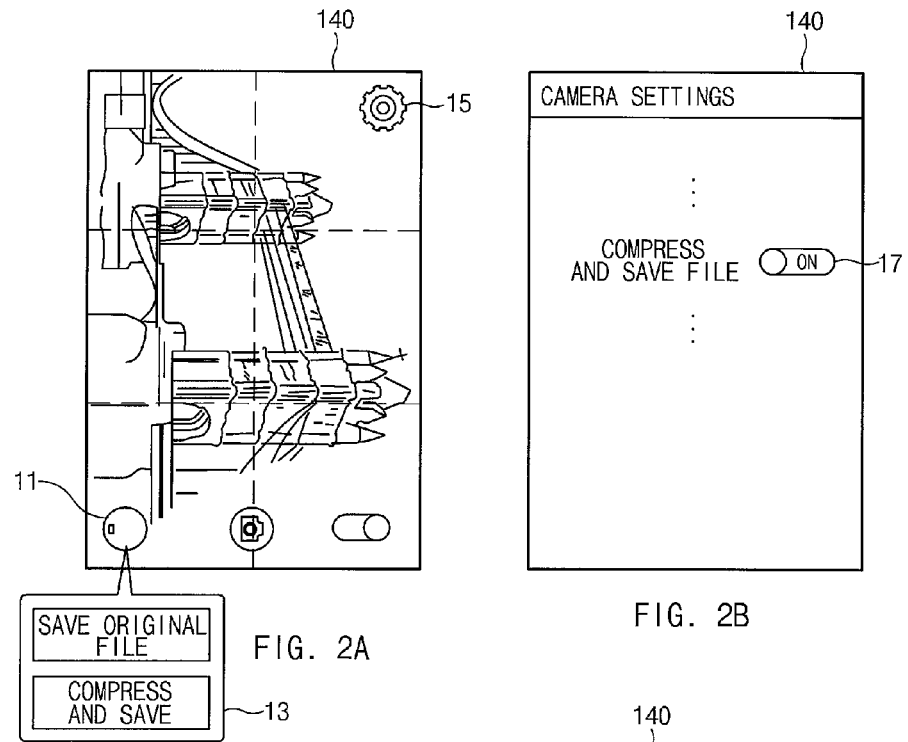
FIG. 2A
FIG. 2B
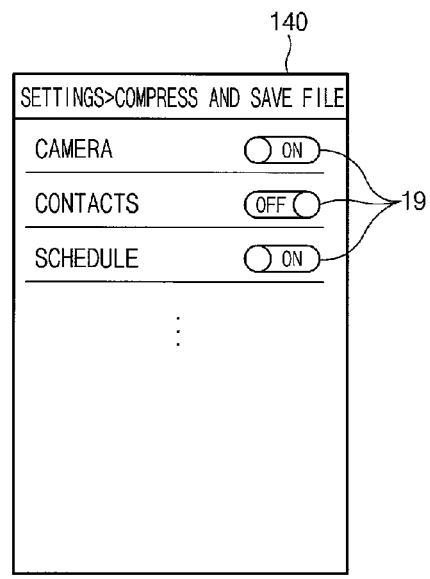
FIG. 2C

ELECTRONIC DEVICE AND FILE READ AND WRITE METHOD THEREOF

CROSS-REFERENCE TO RELATED APPLICATION AND CLAIM OF PRIORITY

The present application is related to and claims the benefit under 35 U.S.C. § 119(a) of a Korean patent application filed on Apr. 14, 2015 in the Korean Intellectual Property Office and assigned Serial number 10-2015-0052221, the entire disclosure of which is hereby incorporated by reference.

TECHNICAL FIELD

The present disclosure relates to a method of writing a file in a memory included in an electronic device and reading the saved file.

BACKGROUND

Various electronic devices are being developed. In recent, since providing various services such as shooting, music play, video play, e-mail service, social networking service (SNS), and the like, portable electronic devices such as a smartphone, a tablet personal computer (PC), and the like are widely used.

As a function of the portable electronic device is diversified, a variety of files such as a picture, a video, music, a contact list, a schedule, and the like are saved therein. Therefore, a size of the files to be saved in the portable electronic device may be significant criteria for a performance improvement of the portable electronic device. Accordingly, an efficient file reading and writing schemes are needed to improve the performance of the portable electronic device when storage of the portable electronic device is insufficient.

SUMMARY

To address the above-discussed deficiencies, it is a primary object to provide at least the advantages described below. Accordingly, an aspect of the present disclosure is to provide an electronic device that effectively secures a storage space by compressing and saving a file to be saved in a portable electronic device and a file reading and writing method thereof.

Another aspect of the present disclosure is to provide an electronic device and a file reading that effectively performs reading and writing of a compressed file without reducing a performance of the electronic device and writing method thereof.

In accordance with an aspect of the present disclosure, an electronic device may include at least one first memory being nonvolatile and a processor electrically connected to the first memory and configured to read a file from the first memory or to write a file on the first memory. The first memory may store instructions, the instructions, when executed, causing the processor to provide a software layer structure including a first virtual file system layer configured to interface with an application program layer, a compressed file system layer being a lower layer of the first virtual file system layer and configured to compress at least a part of data of the written file or to decompress at least a part of data of the read file, a second virtual file system layer being a lower layer of the compressed file system layer and configured to manage the written or read file, and a first file system layer being a lower layer of the second virtual file system layer and configured to read at least a part of the file from the first memory or to write at least a part of the file on the first memory.

In accordance with an aspect of the present disclosure, a file write method of an electronic device may include requesting a compressed file system layer to write data based on a file write request of an application program layer, at a first virtual file system layer, compressing the data at the compressed file system layer, requesting a second virtual file system layer to write the compressed data at the compressed file system layer, and writing the compressed data in a first memory through a first file system layer at the second virtual file system layer.

In accordance with an aspect of the present disclosure, a file read method of an electronic device may include requesting a compressed file system layer to read data through a first virtual file system layer at an application program layer, requesting a second virtual file system layer to read the data at the compressed file system layer, requesting a block layer to read the data through a first file system layer at the second virtual file system layer, reading the data from a first memory at the block layer, transmitting the read data to the second virtual file system layer through the first file system layer at the block layer, decompressing the data transmitted to the second virtual file system layer at the compressed file system layer, and transmitting the uncompressed data to the application program layer through the first virtual file system layer at the compressed file system layer.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A-C are schematic diagrams illustrating a user interface according to various embodiments of the present disclosure;

Throughout the drawings, it should be noted that like reference numbers are used to depict the same or similar elements, features, and structures.

DETAILED DESCRIPTION

Figure 1:
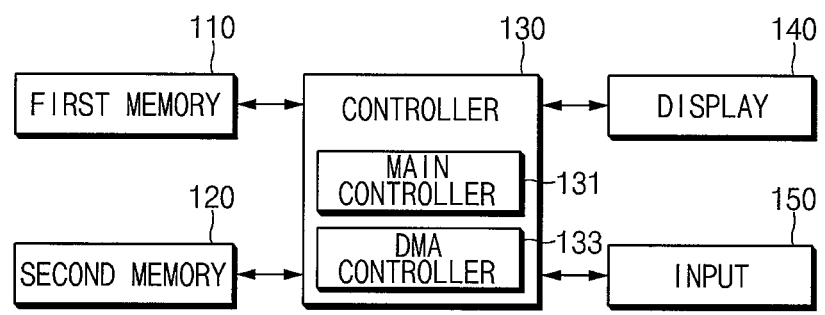
FIG. 1 is a block diagram illustrating a configuration of an electronic device according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged in an electronic device. Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals. Terms used in this specification are used to describe specified embodiments of the present disclosure and are not intended to limit the scope of the present disclosure. The terms of a singular form may include plural forms unless otherwise specified.

In the disclosure disclosed herein, the expressions "A or B", "at least one of A and/or B", or "one or more of A and/or B", and the like used herein may include any and all combinations of one or more of the associated listed items.

The terms, such as "first", "second", and the like used herein may refer to elements of various embodiments of the present disclosure, but do not limit the elements. It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present.

According to the situation, the expression "configured to" used herein may be used as, for example, the expression "suitable for", "having the capacity to", "designed to", "adapted to", "made to", or "capable of". The "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

An electronic device according to various embodiments of the present disclosure may include, for example, at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable circuit (e.g., implantable circuit).

According to an embodiment, an electronic device may include at least one of, for example, televisions (TVs), digital versatile disc (DVD) players, audios, refrigerators, air conditioners, cleaners, ovens, microwave ovens, washing machines, air cleaners, set-top boxes, media boxes (e.g., Samsung HomeSync™, Apple TV™, or Google TV™), game consoles (e.g., Xbox™ and PlayStation™), electronic dictionaries, electronic keys, camcorders, or electronic picture frames.

According to another embodiment of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, drone, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, or the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment may not be limited to the above-described electronic devices. The term "user" used herein may refer to a person who uses an electronic device or may refer to a device (e.g., an artificial intelligence electronic device) that uses an electronic device.

FIG. 1 is a block diagram illustrating a configuration of an electronic device according to various embodiments of the present disclosure.

Referring to FIG. 1, an electronic device 100 may include a first memory 110, a second memory 120, a controller 130, a display 140 and an input module 150.

According to an embodiment, the first memory 110 may be a nonvolatile memory. For example, the first memory 110 may be a flash memory. For example, the first memory 110 may include an embedded multimedia card (eMMC), a universal flash storage (UFS), or a secure digital (SD) card.

According to an embodiment, the first memory 110 may include a plurality of partitions. For example, the first memory 110 may include a system partition in which system data (e.g., operating system (OS)) is stored, a boot partition in which a bootloader, a kernel, and the like are stored, and a user partition in which user data (e.g., a contact list, a picture, a music, an application, or the like) is stored.

According to an embodiment, the second memory 120 may be a volatile memory. For example, the second memory 120 may be a random access memory (RAM).

According to an embodiment, the second memory 120 may be used as a system memory, and the system memory may include at least one buffer caching file data. For example, to read or write a file from/to the first memory 110, a part of a memory area of the second memory 120 may be used as a buffer caching data.

The controller 130 may control an overall operation of the electronic device 100. For example, the controller 130 may control each of the first memory 110, the second memory 120, the display 140, and the input module 150 and may read or write a file according to various embodiments of the present disclosure.

According to an embodiment, the controller 130 may include a main controller 131 and a direct memory access (DMA) controller 133.

The main controller 131 may control an overall operation of the electronic device 100. For example, the main controller 131 may control a plurality of hardware or software components connected to the main controller 131 and may perform various data processing and arithmetic operations by driving an operating system or an application program.

According to an embodiment, the main controller 131 may change whether to compress and save a file based on whether to execute (or access) a file saved in the first memory 110 or duration. For example, if there is an application program that is not executed for a designated duration or an uncompressed file that is not accessed for a designated duration, the main controller 131 may compress and save a corresponding file. For another example, if there is a compressed file executed (or accessed) the designated number of times or more for a designated time, the main controller 131 may decompress and save the corresponding file. For still another example, the main controller 131 may compress and save a file, after a designated period, such as a past schedule file. According to an embodiment, the main controller 131 may change whether to compress and save a file to be saved in the first memory 110, based on a designated period. According to an embodiment, the period for changing whether to compress and save a file may be set by a user. According to an embodiment, if a user command is inputted, the main controller 131 may change whether to compress and save a file to be saved in the first memory 110.

The DMA controller 133 may control a file input/output of the first memory 110. For example, the DMA controller 133 may control the first memory 110 and the second memory 120 so as to input (or write) data of the second memory 120 in the first memory 110 based on a file write command of the main controller 131. For another example, the DMA controller 133 control the first memory 110 and the second memory 120 so as to output (or read) data saved in the first memory 120 to the second memory 120 based on a file read command of the main controller 131.

The display 140 may provide a user interface (UI). According to an embodiment, the display 140 may provide a user interface that the user interface selects whether to compress and save a file. For example, the display 140 may be generated (or received) according to the execution of an application (e.g., camera application) at an application execution screen or may provide a user interface that the user interface selects whether to compress a file currently saved in the first memory 110. For another example, the display 140 may provide a user interface that the user interface selects whether to compress a file associated with each application by an application installed in the electronic device 100.

According to an embodiment, the display 140 may provide a user interface associated with a compression storage changing function. For example, the display 140 may provide a user interface for setting a period for changing whether to compress and save a file to be saved in the first memory 110 and a user interface for setting whether to use a compression and save changing function.

According to an embodiment, the display 140 may provide a user interface for setting a partition in which a compressed file will be saved.

FIGS. 2A-C are schematic diagrams illustrating a user interface according to various embodiments of the present disclosure.

Referring to FIG. 2A, an execution screen of a camera application may be displayed on the display 140. The display 140 may provide a user interface that the user interface selects whether to compress and save a file (e.g., a multimedia file saved by executing a camera application) on the execution screen of a camera application. For example, the display 140 may display an icon 11 to select whether to compress and save a file.

According to an embodiment, if the icon 11 is selected by a user, whether to compress and save a file (e.g., a picture, a video, or the like) generated by the camera application may be changed. For example, if the icon 11 is selected in a state set to save the compressed file, the controller 130 may set the electronic device 100 so as to save an original uncompressed file in the first memory 110. If the icon 11 is again selected by a user, the controller 130 may set the electronic device 100 so as to compress and save a file in the first memory 110.

According to an embodiment, if the icon 11 is selected by a user, the display 140 may display a menu 13 to select whether to compress and save a file or whether to save an original file. A user may select whether to save a compressed file or whether to save an original file, using the menu 13 displayed on the display 140.

According to an embodiment, the display 140 may display the icon 15 to enter a setting screen of a camera application. If the icon 15 is selected by a user, the display 140 may display the setting screen illustrated in FIG. 2B. The setting screen displayed on the display 140 may include the icon 17 to select whether to compress and save a file. A user may select whether to compress and save a file, using the icon 17 displayed on the display 140. In an embodiment described with reference to FIGS. 2A and 2B, a camera application is an example. However, an embodiment of the present disclosure may not be limited thereto. That is, a kind of application is not limited thereto. A variety of applications may provide a user interface (e.g., icon and menu) similar to the user interface displayed on a part of an application screen. For example, a browser, a multimedia streaming application, and the like may provide a user interface that the user interface selects a storage method of a file, which is newly generated or received, on a part of an application screen.

Referring to FIG. 2C, the setting screen of the electronic device 100 may be displayed on the display 140. The display 140 may display a user interface that the user interface selects whether to compress and save a file, on the setting screen of the electronic device 100. For example, the display 140 may display the icon 17 to select, by an installed application, whether to compress and save a file. A user may select whether to compress and save a file with respect to each application using the icons 19 displayed on the display 140.

The input module 150 may receive a user command. According to an embodiment, the input module 150 may include a touch sensor panel for sensing a touch manipulation of a user or a pen sensor panel for sensing a pen manipulation of a user. According to an embodiment, the input module 150 may include a motion recognition sensor for recognizing the motion of a user or a voice recognition sensor for recognizing the voice of a user.

According to an embodiment, the input module 150 may receive a user command for selecting whether to compress and save a file. For example, a user may select whether to compress a file, using a user interface displayed on the display 140.

According to an embodiment, the input module 150 may receive a user command for setting a period for changing whether to compress and save a file to be saved in the first memory 110. According to an embodiment, the input module 150 may receive a user command for setting whether to use a compression and save changing function with respect to a file to be saved in the first memory 110. According to an embodiment, the input module 150 may receive a user command that allows the compression and save changing function to be performed with respect to a file to be saved in the first memory 110.

According to an embodiment, the input module 150 may receive a user command for setting a partition in which a compressed file will be saved.

Figure 3:
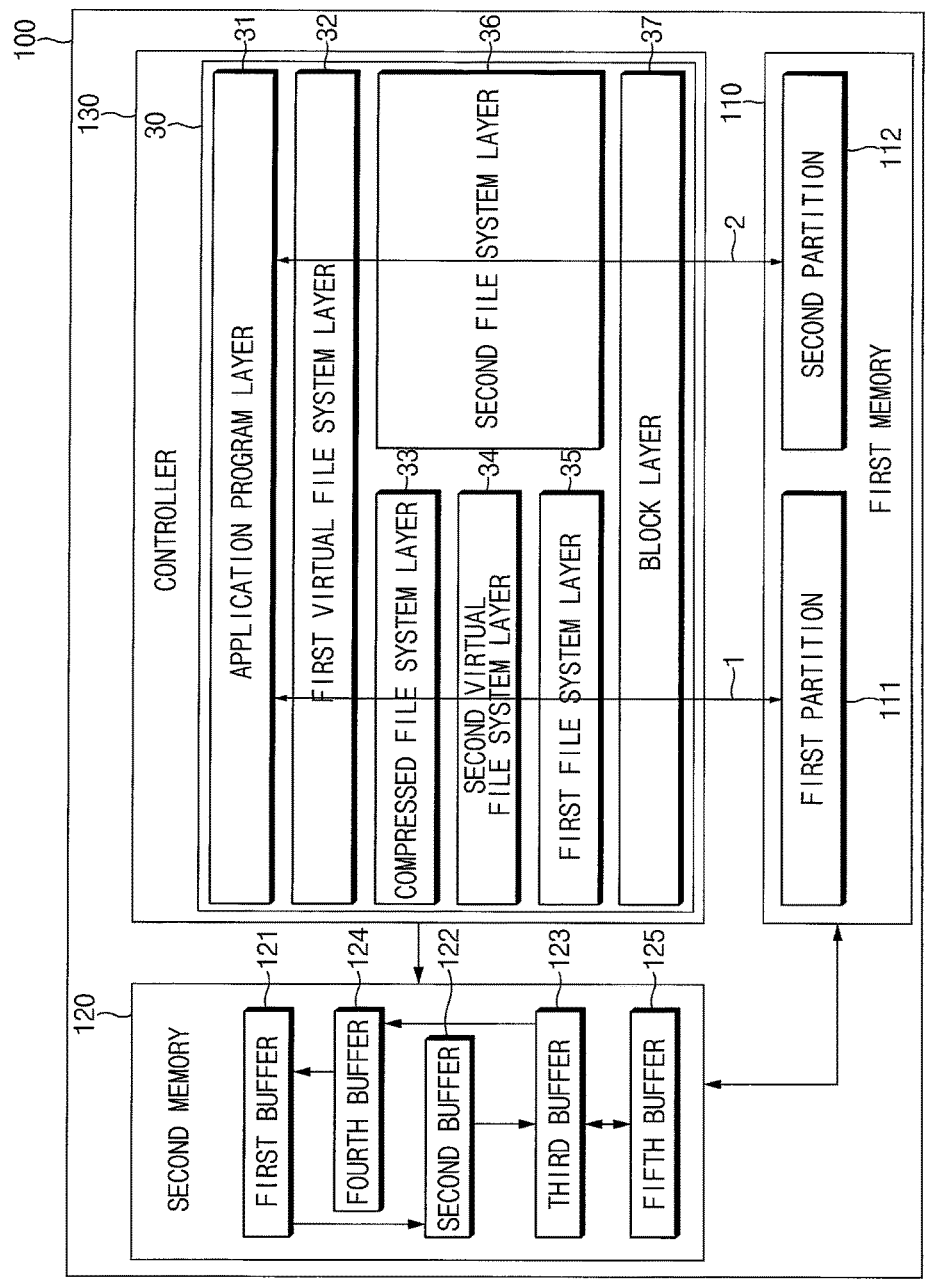
FIG. 3 is a block diagram illustrating a software layer structure according to various embodiments of the present disclosure.

FIG. 3 is a block diagram illustrating a software layer structure according to various embodiments of the present disclosure.

According to an embodiment, the controller 130 may read or write a file by a software layer structure 30 illustrated in FIG. 3. Referring to FIG. 3, the software layer structure 30 may include an application program layer 31, a first virtual file system layer 32, a compressed file system layer 33, a second virtual file system layer 34, a first file system layer 35, a second file system layer 36, and a block layer 37.

The application program layer 31 may be a top-level layer of the software layer structure 30 and may be a layer for driving an application program such as an application. According to an embodiment, the application program layer 31 may generate the request of a file read or file write to the first virtual file system layer 32 based on the execution of an application. For example, the application program layer 31 may request the first virtual file system layer 32 to read or write a file based on the execution of an application program or a user command. In an embodiment described with reference to FIG. 3, application programs of the application program layer 31 may be described as generating the request of the file read or file write to the first virtual file system layer 32. A service or module that is driven at an operating system (e.g., kernel) or a framework may also request the first virtual file system layer 32 to read or write a file. Parts described as the application program layer 31 herein may be changed into a service or module that is the same as the above-described service or module.

The first virtual file system layer 32 may be a lower layer of the application program layer 31 and may manage original data (e.g., uncompressed data that the application program layer 31 requests the first virtual file system layer 32 to read or write) based on the request of the application program layer 31. The first virtual file system layer 32 may allow an application program to access various types of file systems based on a defined interface or a define standard with a kernel and a file system. According to an embodiment, the first virtual file system layer 32 may manage data by a first data unit (or by a page unit). The first data unit may be, for example, 4 kilobyte (KB).

The compressed file system layer 33 may be a lower layer of the first virtual file system layer 32 and may compress or decompress data. For example, if the first virtual file system layer 32 is requested to write a file, the compressed file system layer 33 may compress data transmitted from the first virtual file system layer 32. For another example, if the first virtual file system layer 32 is requested to read a file, the compressed file system layer 33 may read and decompress compressed data from the second virtual file system layer 34 being a lower layer.

According to an embodiment, the compressed file system layer 33 may compress data by second data (or a compression unit, a cluster unit, or the like) which is a multiple (e.g., once, twice, or four times) of the first data unit by which the first virtual file system layer 32 manages data. The second data unit may be, for example, 4 KB. In the case of a compression herein, to divide file data by the second data unit may be referred to as "cluster (or compressed cluster)". As the second data unit increases, the compression ratio of a cluster may increase. However, in spite of an access to a small amount of file data, an overhead to read and decompress data of the second data unit from the first memory 110 may occur.

The second virtual file system layer 34 may be a lower layer of the compressed file system layer 33 and may access various types of file systems based on a defined interface a define standard with a kernel and a file system such as the first virtual file system layer 32. According to an embodiment, the second virtual file system layer 34 may manage data by a first data unit (or by a page unit).

According to an embodiment, the second virtual file system layer 34 may be omitted. However, in the case where there is the second virtual file system layer 34, a file system layer may be easily changed, and a plurality of file system layers may be provided to a lower layer.

The first file system layer 35 may be a lower layer of the second virtual file system layer 34 and may generate and manage a file and a directory. The first file system layer 35 may access the first memory 110 through the block layer 37 and may read or write a file.

According to an embodiment, the first file system layer 35 may include at least one file system. For example, the first file system layer 35 may include legacy file systems, which a conventional operating system has, such as a file system of ExT series (e.g., EXT2, EXT3, EXT4, or the like), a file system of FAT series (e.g., FAT12, FAT16, FAT32, or the like), and the like and may not be limited to a kind of specific file system.

The second file system layer 36 may be a lower layer of the file virtual file system layer 32 and may generate and manage a file and a directory. The second file system layer 36 may access the first memory 110 through the block layer 37 and may read or write a file. According to an embodiment, the second file system layer 36 may include at least one file system. According to an embodiment, the second file system layer 36 may be a file system that is the same as or different from the first file system layer 35.

According to an embodiment, each of the first file system layer 35 and the second file system layer 36 may access different partitions (or blocks) from each other of the first memory 110 and may read or write a file. For example, the first file system layer 35 may access a first partition 111, and the second file system layer 36 may access a second partition 112.

The block layer 37 may be a lower layer of the first file system layer 35 and the second file system layer 36 and may exchange data with the first memory 110. According to an embodiment, the block layer 37 may input and output data by an arbitrary block or page unit (e.g., 512 byte to 8 KB unit) based on a specification of the first memory 110.

Referring to FIG. 3, the first memory 110 may include the first partition 111 and the second partition 112. The controller 130 may read or write a file from/to the first and second partitions 111 and 112 through different paths from each other. For example, the controller 130 may read or write a file from/to the first partitions 111 through a first path 1 and may read or write a file from/to the second partitions 112 through a second path 2. The file saved in the first partition 111 through the first path 1 may include data compressed by the compressed file system layer 33 and data decompressed by the compressed file system layer 33, and the file saved in the second partition 112 through the second path 2 may include uncompressed data.

According to an embodiment, the first partition 111 may be a partition in which a system file is saved, and the second partition 112 may be a partition in which a user file is saved. For example, the system file may be compressed and saved in the first partition 111, and the user file may be saved in the second partition 112 in the uncompressed form.

According to an embodiment, the first partition 111 may be a partition in which a system file and a user file are saved, and the second partition 112 may be a partition in which a user file is saved. For example, the system file may be compressed and saved in the first partition 111, a file, which is set to be compressed and saved according to a user command (or according to a predetermined list or policy), among the user file may be saved in the first partition 111 through the first path 1, and a file set to be decompressed and saved may be saved in the second partition 112 through the second path 2.

According to an embodiment, a partition in which a compressed file is saved may be changed according to a user command. According to an embodiment, if a partition in which a compressed file is saved is changed, the controller 130 may reboot the electronic device 100 and may mount a file system corresponding to each partition.

Referring to FIG. 3, the second memory 120 may include a first buffer 121, a second buffer 122, a third buffer 123, a fourth buffer 124, and a fifth buffer 125. The first buffer 121 may cache data managed at the first virtual file system layer 32. The second buffer 122 may cache data managed at the compressed file system layer 33. The third buffer 123 may cache data managed at the second virtual file system layer 34. The fifth buffer 125 may cache data managed at the block layer 37. According to an embodiment, the first virtual file system layer 32, the compressed file system layer 33, and the second virtual file system layer 34 may read or write data from/to the first buffer 121, the second buffer 122, and the third buffer 123 by the first data unit (e.g., 4 KB unit that is a memory management unit of an operating system such as LINUX, or the like), respectively. The first to third buffers 121, 122, and 123 used at each software layer may not be a buffer that is specifically operated (or having an area) at each layer and may be a memory managed as a page cache by a memory manager of an operating system.

When reading a file, the fourth buffer 124 (or cluster read buffer) may cache data decompressed by the compressed file system layer 33. For example, data cached at the third buffer 123 may be decompressed by the compressed file system layer 33 and may be cached in the fourth buffer 124. The data cached in the fourth buffer 124 may be read (or copied) to the first buffer 124 according to the request of the first virtual file system layer 32. According to an embodiment, the fourth buffer 124 may be used when only reading a file saved in the first memory 110. According to an embodiment, the fourth buffer 124 may include cluster slots having the designated number (e.g., 20). The cluster slot may be a memory space for storing data of an uncompressed single cluster.

According to an embodiment, the compressed file system layer 33 may manage a plurality of cluster slots included in the fourth buffer 124 in the sequentially connected form (e.g., ring buffer and array). For example, when copying an uncompressed file into the fourth buffer 124, the compressed file system layer 33 may use a cluster slot following a cluster slot that is immediately used.

According to an embodiment, to read or write a file by the above-mentioned software layer structure, the controller 130 may mount a file system. The mounting of a file system may mean an operation to load metadata, which is stored in the first memory 110, of a file system and to build a path for accessing the first memory 110 or a layer structure of a file system. According to an embodiment, if the electronic device 100 is booted, the controller 130 may initialize the first memory 110 and may mount the first file system (layer) about at least a part of an area (e.g., partition) of the first memory 110 on the second memory 120. Moreover, the controller 130 may again mount a compressed file system (layer) about the area of the first memory 110 on the second memory 120. That is, the compressed file system may be designed as a stackable file system. According to an embodiment, the controller 130 may mount a file system on the second memory 120 by a partition included in the first memory 110. For example, the controller 130 may sequentially mount the first file system and the compressed file system about the first partition 111 on the second memory 120 and may mount the second file system about the second partition 112 on the second memory 120.

Figure 4:
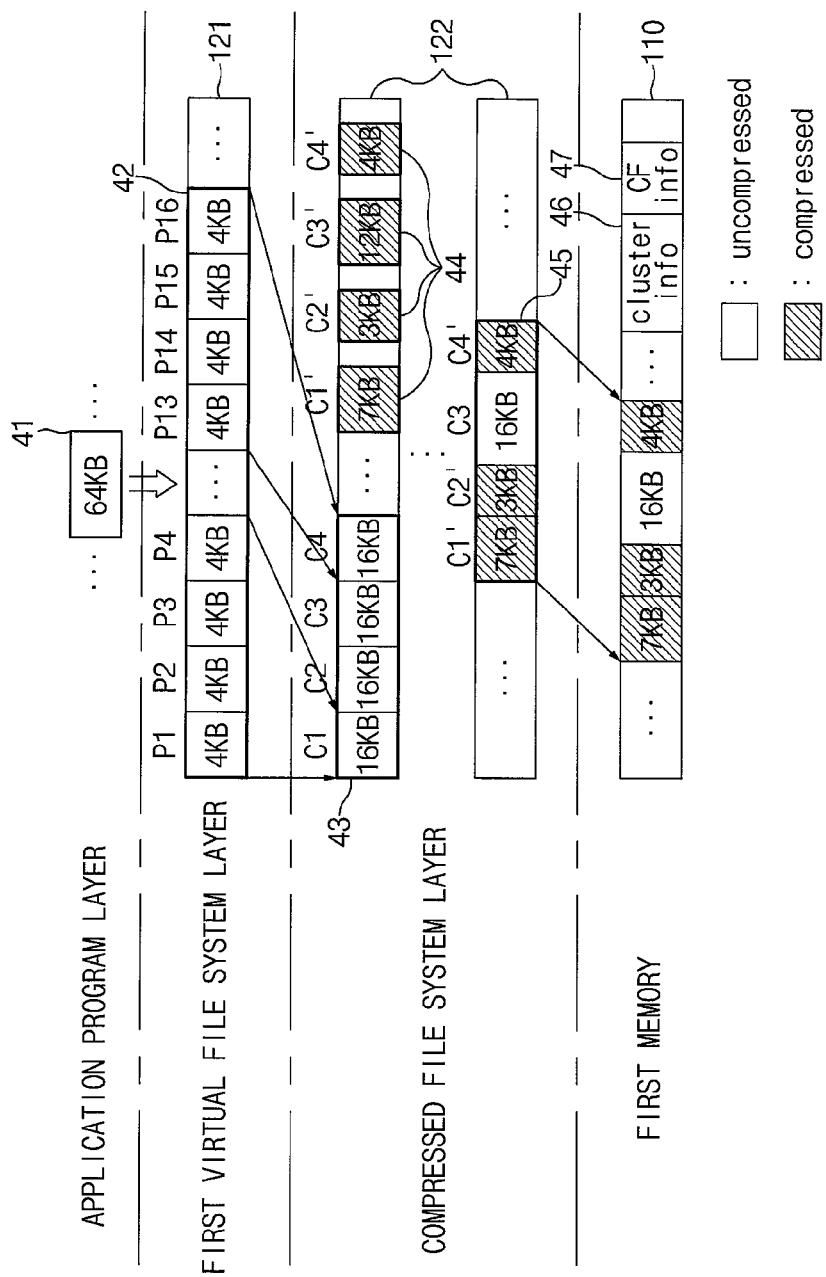
FIG. 4 is a block diagram illustrating a file write operation according to various embodiments of the present disclosure.

An embodiment of the present disclosure is exemplified as an application unit of each file system is a partition. However, the controller 130 may mount an arbitrary file system, on the second memory 120, about an arbitrary physical block or set of blocks included in the first memory 110. FIG. 4 is a block diagram illustrating a file write operation according to various embodiments of the present disclosure.

In FIG. 4, the case that the application program layer 31 requests a write operation about the data 41 of 64 KB from the first virtual file system layer 32 is described as an example. The first virtual file system layer 32 may copy data 41, which the application program layer 31 requests, into the first buffer 121. According to an embodiment, the first virtual file system layer 32 may manage data of the first buffer 121 by a first data unit (or by a page unit). For example, the first data unit may be a unit for managing the second memory 120 at an operating system and may be 4 KB page unit in the case of LINUX. The first virtual file system layer 32 may request the compressed file system layer 33 to write data 42 stored in the first buffer 121. The compressed file system layer 33 may copy the data 42 of the first buffer 121 into the second buffer 122 based on the request of the first virtual file system layer 32. According to an embodiment, the compressed file system layer 33 may manage data of the second buffer 122 by a first data unit (or by a page unit). For example, in the case where data stored in the first buffer 121 is not sequentially stored by a cluster unit, the compressed file system layer 33 may copy the data stored in the first buffer 121 into the second buffer 122 and may manage the second buffer 122 as a buffer independent of the first buffer 121. For another example, in the case where data stored in the first buffer 121 is sequentially stored by a cluster unit, the compressed file system layer 33 may manage data stored in the first buffer 121 as data stored in the second buffer 122 using a memory address of the data stored in the first buffer 121, not copying the data stored in the first buffer 121 into the second buffer 122.

According to an embodiment, the compressed file system layer 33 may compress data 43 of the second buffer 122. In the case where data is compressed by a page unit (e.g., 4 KB) when the compressed file system layer 33 compresses data, because of a compression sample is small, a compression influence may have an limitation. Accordingly, the compressed file system layer 33 may compress the data 43 of the second buffer 122 by the second data unit (e.g., cluster unit) being a multiple (e.g., four times) of the first data unit. One cluster may have, for example, a size of 16 KB. For example, in the case of the data 43 of the second buffer 122, data of first to fourth pages P1 to P4 may correspond to a first cluster C1, data of fifth to eighth pages P5 to P8 may correspond to a second cluster C2, data of ninth to twelfth pages P9 to P12 may correspond to a third cluster C3, and data of thirteenth to sixteenth pages P13 to P16 may correspond to a fourth cluster C4. Accordingly, the compressed file system layer 33 may compress the data 43 of the second buffer 122 by the cluster unit and may generate compressed data 44 as the result.

According to an embodiment, the compressed file system layer 33 may request the second virtual file system layer 34 to write the compressed data 44. The second virtual file system layer 34 may access the first memory 110 through the first file system layer 35 and may write the compressed data 44.

According to an embodiment, the compression ratio of the compressed data 44 may be different from each other by a cluster. For example, the first cluster C1 may be compressed as data C1' of 7 KB, the second cluster C2 may be compressed as data C2' of 3 KB, the third cluster C3 may be compressed as data C3' of 12 KB, and the fourth cluster C4 may be compressed as data C4' of 4 KB. According to an embodiment, the compressed file system layer 33 may select one of original data and compressed data based on the compression ratio of data and may request the second virtual file system layer 34 to write the one. For example, if a compression ratio of data is smaller than or equal to a designated ratio (e.g., 50%), the compressed file system layer 33 may request the second virtual file system layer 34 to write original data that is decompressed. In the case of the third cluster C3 illustrated in FIG. 3, because the size of the compressed data C3' is 12 KB and the compression ratio of the compressed data C3' is 50% or less, the compressed file system layer 33 may request the second virtual file system layer 34 to write original data C3 that is decompressed. According to an embodiment, with regard to data of which the compression ratio is not great, data throughput in a decompression process may be reduced by storing original data.

As described above, because the compression ratio of each cluster is different from each other, the compressed data 44 may be discontinuously stored in a memory space on the second buffer 122. In the case where data discontinuously stored on the second buffer 122 is written in the first memory 110, each data may be also discontinuously stored in the first memory 110. According to an embodiment, the compressed file system layer 33 may continuously arrange the compressed data 44 (i.e., original data in the case where a compression ratio is smaller than or equal to a designated ratio) so as to correspond with an input/output unit of the first memory 110. For example, referring to FIG. 3, data 45 including the first compressed cluster C1', the second compressed cluster C2', the third uncompressed cluster C3, and the fourth compressed cluster C4' may be continuously arranged in the second buffer 122. According to an embodiment, the compressed file system layer 33 may request the second virtual file system layer 34 to write the data 45 continuously arranged and the second virtual file system layer 34 may access the first memory 110 through the first file system layer 35 and may continuously write a data. According to an embodiment, the efficiency of a storage space of the first memory 110 may be improved.

According to an embodiment, the compressed file system layer 33 may generate information 46 (or compressed cluster information) about a compressed cluster and may save the information 46 and the compressed file in the first memory 110 together. For example, the compressed file system layer 33 may generate and manage information about a starting point and a compressed size of a cluster in a file with respect to each cluster. The starting point of a cluster may be, for example, an offset value in which that the starting point of a file in which a cluster is included is '0' is determined. The compressed cluster information 46 may be used to calculate a cluster area to which data needed when a compressed file saved in the first memory 110 is read belongs. The size of the compressed cluster information 46 may be different based on the size of a file or the number of clusters. According to an embodiment, information of one cluster may be generated and managed by each cluster. Below, Table 1 is an example of a structure indicating cluster information.

TABLE 1

```
struct Cluster_info {
    __u32 offset; // starting position of a cluster in a file
    __u32 size; // the size of a cluster (byte length)
};
```

According to an embodiment, the compressed file system layer 33 may generate information 47 (or compressed file information) about a compressed file and may save the information 47 and the compressed file in the first memory 110 together. According to an embodiment, the compressed file information 47 may include at least one of the unit size of a cluster, the file size before compression, and compression algorithm information. The size of a cluster and a compression algorithm may be different based on a file, and thus the fourth buffer 124 used when a file is read may be changed. Because an application program does not recognize whether to compress and save a file, the file recognized at the application program may correspond to an uncompressed file. Accordingly, when the application program identify information of a file, the compressed file system layer 33 may identify the compressed file information 47 and may transmit information (i.e., about an original file) before compression to the application program. Below, Table 2 is an example of a structure about the compressed file information.

TABLE 2

```
struct CompressedFile_info
{
    __s32 cluster_size;    //the unit size of a cluster before compression
    __s64 original_file_size; //the file size before compression
    __s32 comp_type; // a kind of compression algorithm
}
```

Figure 5:
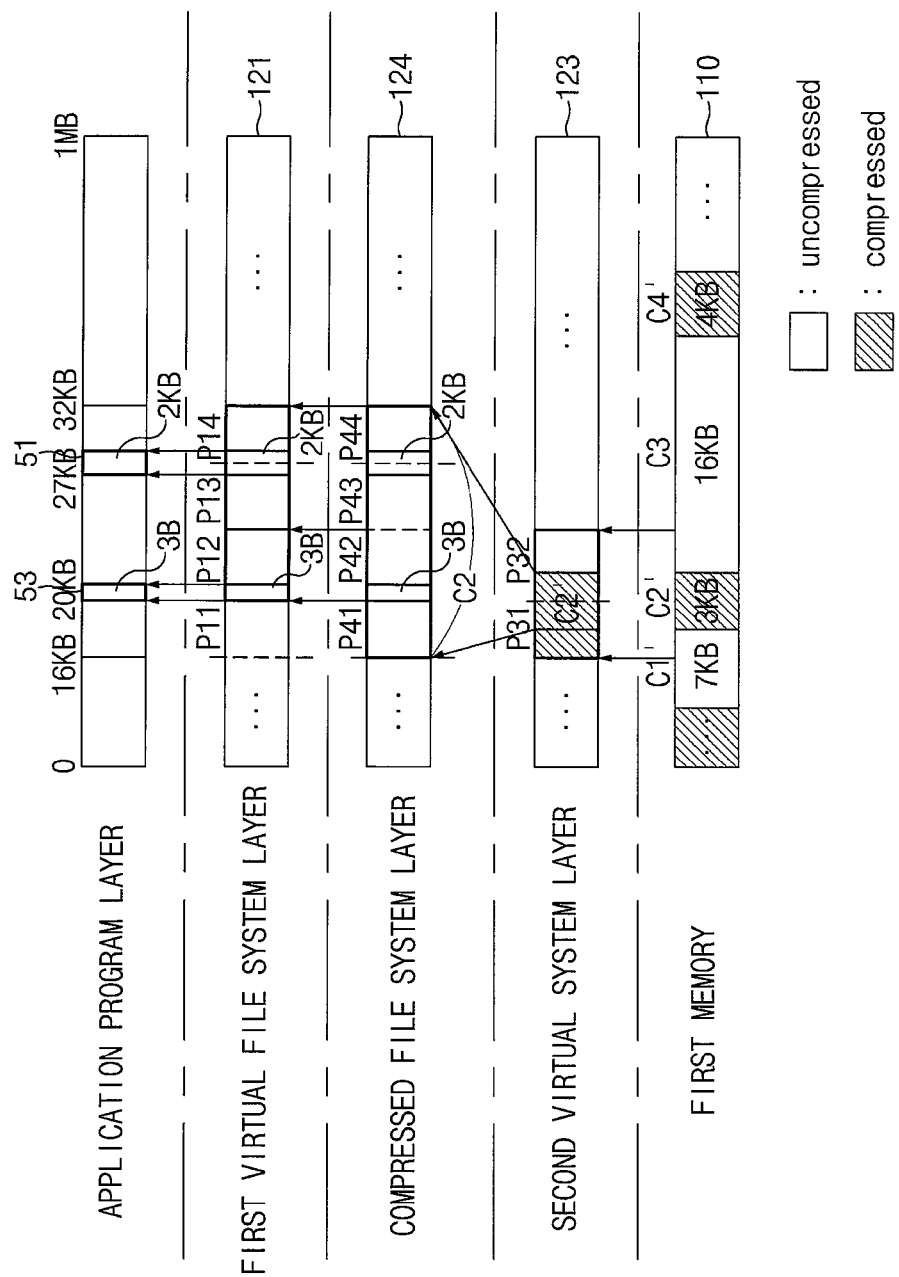
FIG. 5 is a block diagram illustrating a file read operation according to various embodiments of the present disclosure.

FIG. 5 is a block diagram illustrating a file read operation according to various embodiments of the present disclosure.

In a file read operation illustrated in FIG. 5, the case that an application program requests first data 51 of 2 KB at a point in time when a file of 1 megabyte (MB) corresponds to a point of 27 KB and requests second data 53 of 3 byte at a point in time when the file corresponds to a point of 20 KB is described as an example.

According to an embodiment, the application program layer 31 may request the first virtual file system layer 32 to read the first data 51. According to an embodiment, the first virtual file system layer 32 may allocate two memory pages P13 and P14 about the first data in the first buffer 121 and may request the compressed file system layer 33 to read data. According to an embodiment, the compressed file system layer 33 may identify a position, which is on the first memory 110, of requested data and may identify that the requested data is included in the second compressed cluster CT. According to an embodiment, the compressed file system layer 33 may identify the size (i.e., 3 KB) of the second compressed cluster CT and may request the second virtual file system layer 34 to read data. According to another embodiment, the compressed file system layer 33 may allocate a memory space about the second compressed cluster CT and may request the second virtual file system layer 34 to read data. The second virtual file system layer 34 may allocate two memory pages P31 and P32 about data requested from the third buffer 123.

According to an embodiment, the second virtual file system layer 34 may access the first memory 110 (through the first file system layer 35 and the block layer 37), and data in which the second compressed cluster C2' is stored in the first memory 110 is included may be copied into two memory pages P31 and P32 allocated the third buffer 123 (through the block layer 37 and the first file system layer 35). According to an embodiment, the compressed file system layer 33 may access the third memory 123 and may decompress the second compressed cluster C2' cached in the third buffer 123. For example, the compressed file system layer 33 may access the third buffer 123 in an access manner using an address of data (i.e., data of the second compressed cluster C2') read from the second virtual file system layer 34. In another embodiment, in the case where a memory space for the second compressed cluster C2' is allocated in the second buffer 122, The compressed file system layer 33 may copy the second compressed cluster C2' cached in the third buffer 123 into a memory space allocated in the second buffer 122 and may decompress the second compressed cluster C2' copied in the second buffer 122.

According to an embodiment, the compressed file system layer 33 may copy and cache the second cluster C2, which is decompressed, into the fourth buffer 124 (i.e., term "caching" may denote storing data in a system memory). According to an embodiment, the first virtual file system layer 32 may copy two pages P43 and P44, in which the first data 51, which an application program layer 31 requests, from among data of the second cluster C2 cached in the fourth buffer 124 is included, into two pages P13 and P14 allocated in the first buffer 121. According to an embodiment, the first virtual file system layer 32 may transmit the first data 51, which the an application program requests, from among data cached in the two pages P13 and P14 of the first buffer 121, to the application program layer 31.

According to an embodiment, the application program layer 31 may request the first virtual file system layer 32 to read second data 53. According to an embodiment, the first virtual file system layer 32 may allocate the memory page P12 about the first data in the first buffer 121 and may request the compressed file system layer 33 to read data. According to an embodiment, the compressed file system layer 33 may identify whether the second data 53, which the first virtual file system layer 32 request, is cached in the fourth buffer 124. According to an embodiment, the compressed file system layer 33 may identify that the second data 53 is included in the second cluster C2 cached in the fourth buffer 124 and may copy a page P42, in which the second data 53 is included, from among data included in the second cluster C2, into the page P12 allocated in the first buffer 121. According to an embodiment, the first virtual file system layer 32 may transmit the first data 53, which an application program requests, from among data cached in the page P12 of the first buffer 121, to the application program layer 31.

According to an embodiment, the fourth buffer 124 (or, cluster read buffer) may be managed on the second memory 120 by the compressed file system layer 33. According to an embodiment, an information structure for managing the fourth buffer 124 (or, cluster read buffer) may be managed on the second memory 120 by the compressed file system layer 33.

Below, Table 3 is an example of an information structure for managing a cluster slot being a component of the fourth buffer 124. As described above, the cluster slot may be a memory space for storing data of an uncompressed single cluster.

TABLE 3

```
struct ClusterReadBuf_Slot{
    struct page *u_page; // 16KB uncompressed Data
    int inode;   // distinction as to whether it is any file
    int clust_num; // distinction as to whether it is any cluster
    atomic_t is_Valid;  // a state where uncompressed data is copied into a cluster slot
};
```

According to an embodiment, the compressed file system layer 33 may manage information about whether a cluster in a file is currently occupied by a cluster slot included in the fourth buffer 124 or whether uncompressed data is filled. Whether the uncompressed data is filled may mean a state where data of a corresponding cluster is decompressed and a memory copy is completed in a cluster slot (e.g., in Table 3, is_Valid factor of ClusterReadBuf_Slot may perform a corresponding function). That is, if data is requested from the first virtual file system layer 32, the compressed file system layer 33 may identify information of cluster slots of the fourth buffer 124 and may identify whether a cluster corresponding to requested data is in the fourth buffer 124 (or, cluster read buffer). If there is data requested from the fourth buffer 124 (i.e., Cache hit), the compressed file system layer 33 may transmit (or copy) corresponding data to the first virtual file system layer 32. In the case where a decompression task about the requested data is performed, the compressed file system layer 33 may copy corresponding data into the first virtual file system layer 32 as soon as the decompression task is completed. If there is not data requested from the fourth buffer 124, the compressed file system layer 33 may request the second virtual file system layer 34 to read data.

According to an embodiment described with reference to FIG. 5, when the second data 53 is read, the fourth buffer 124 caching uncompressed data may be operated, and thus the data cached in the fourth buffer 124 may be transmitted to the application program layer 31, not additionally reading and decompressing data from the first memory 110.

Figure 6:
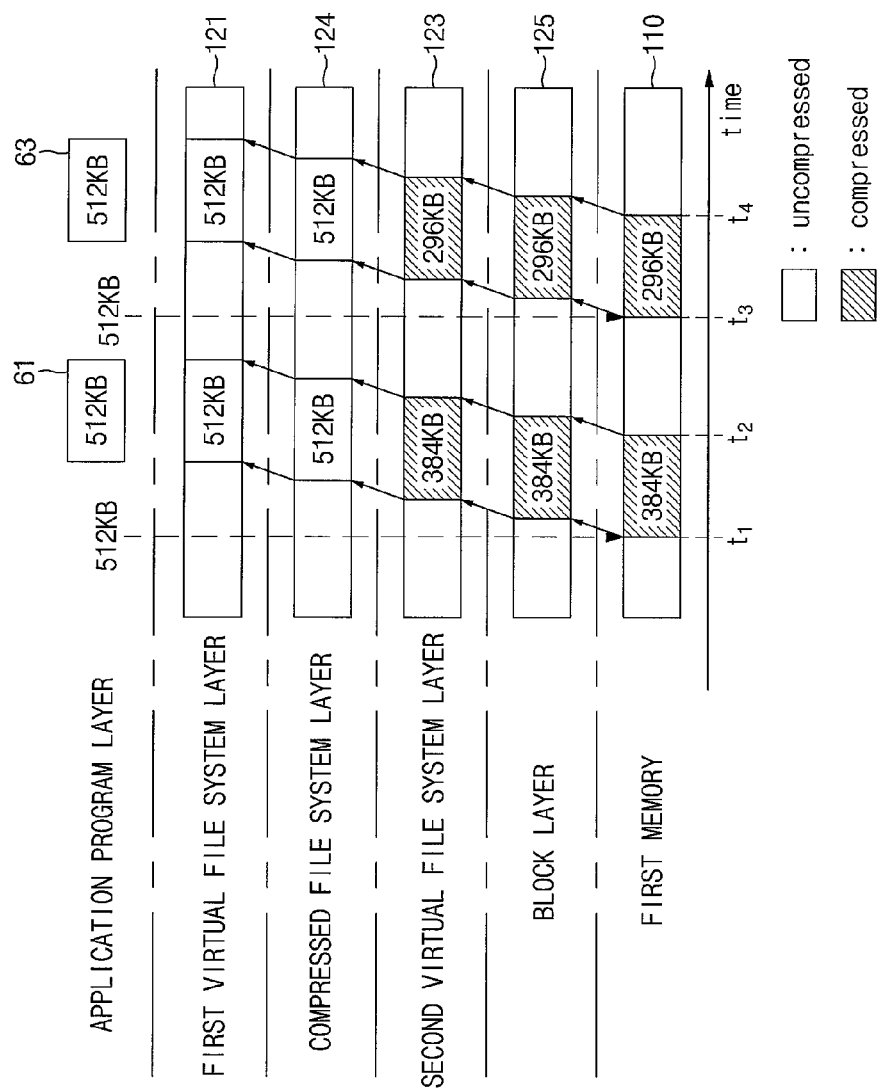
FIG. 6 is a block diagram illustrating a file read operation according to various embodiments of the present disclosure.

FIG. 6 is a block diagram illustrating a file read operation according to various embodiments of the present disclosure.

FIG. 6 is a block diagram illustrating a file read operation according to various embodiments of the present disclosure based on a time sequence. The file read operation illustrated in FIG. 6 is exemplified as an application program sequentially requests data by 512 KB unit.

According to an embodiment, the application program layer 31 may request the first virtual file system layer 32 to read first data 61 of 512 KB. According to an embodiment, the first virtual file system layer 32 may request the compressed file system layer 33 to read the first data 61. According to an embodiment, the compressed file system layer 33 may identify that the first data 61 is compressed and saved to 384 KB and may request the second virtual file system layer 34 to read the first data compressed. According to an embodiment, the second virtual file system layer 34 may request the block layer 37 to read the first data compressed (through the first file system layer 35). According to an embodiment, the block layer 37 may access the first memory 110 and may read the first data compressed to 384 KB to the fifth buffer 125, which the block layer 37 requests, from a first time t1 to a second time t2.

According to an embodiment, before the first data compressed is completely read from the first memory 110, the block layer 37 may copy the data read to the fifth buffer 125 into the third buffer 123. According to an embodiment, before the first data is completely copied into the third buffer 123, the compressed file system layer 33 may decompress the first data stored in the third buffer 123. That is, an operation in which the block layer 37 copies data stored in the fifth buffer 125 to the third buffer 123 or an operation in which the compressed file system layer 33 decompresses data stored in the third buffer 123 may be simultaneously performed together with an operation in which the block layer 37 reads data from the first memory 110.

In terms of hardware, an operation in which the block layer 37 reads data from the first memory 110 may be performed by a processor (e.g., by the DMA controller 133) except for the main controller 131, and an operation in which the block layer 37 copies data stored in the fifth buffer 125 into the third buffer 123 or an operation in which the compressed file system layer 33 decompresses the read data may be performed by the main controller 131. Because subjects performing an operation to read data from the first memory 110 and an operation to copy and decompress the read data are different from each other, the two operations may be simultaneously performed. According to an embodiment, the DMA controller 133 may read (or copy) data stored in the first memory 110 to the fifth buffer 125 of the second memory 120 that the block layer 37 manages. According to an embodiment, whenever data of a unit (e.g., block unit) designated in the fifth buffer 125 is completely read, the DMA controller 133 may generate an interrupt to the main controller 131 and may notify the main controller 131 of a read situation of data. The main controller 131 may copy data, which is stored in the fifth buffer 125, into the third buffer 123, which the second virtual file system layer 34 manages, in compliance with an interrupt received from the DMA controller 133. Accordingly, the compressed file system layer 33 may decompress data stored in the third buffer 123.

The compressed file system layer 33 may cache uncompressed data in the fourth buffer 124 and may transmit the uncompressed data to the first virtual file system layer 32. According to an embodiment, before total data that an application program requests is completely decompressed, the compressed file system layer 33 may copy data, which is cached in the fourth buffer 124, into the first buffer 121. The first virtual file system layer 32 may transmit data, which is cached in the first buffer 121, to the application program layer 31, and the first data 61 may be completely read.

According to an embodiment, if the first data 61 is completely read (or, before completely read), the application program layer 31 may request the first virtual file system layer 32 to read second data 62 of 512 KB. According to an embodiment, the first virtual file system layer 32 may request the compressed file system layer 33 to read the second data 62. According to an embodiment, the compressed file system layer 33 may identify that the second data 62 is compressed and saved to 296 KB and may request the second virtual file system layer 34 to read the second compressed data. According to an embodiment, the second virtual file system layer 34 may request the block layer 37 to read the second data compressed (through the first file system layer 35). The block layer 37 may access the first memory 110 and may read the second data decompressed to 296 KB to the fifth buffer 125 in which the block layer 37 from a third time t3 to a fourth time t4.

According to an embodiment, before the second data compressed is completely read from the first memory 110, the block layer 37 may copy the data read to the fifth buffer 125 into the third buffer 123. According to an embodiment, before the second data is completely copied into the third buffer 123, the compressed file system layer 33 may decompress the second data stored in the third buffer 123.

The compressed file system layer 33 may cache uncompressed data in the fourth buffer 124 and may transmit the uncompressed data to the first virtual file system layer 32. According to an embodiment, before data that an application program requests is completely decompressed, the compressed file system layer 33 may copy data, which is cached in the fourth buffer 124, into the first buffer 121. The first virtual file system layer 32 may transmit data, which is cached in the first buffer 121, to the application program layer 31, and the second data 62 may be completely read.

According to an embodiment described with reference to FIG. 6, an operation to read data from the first memory 110 to the second memory 120 and an operation to decompress the read data may be simultaneously performed in parallel. Accordingly, a time spent by a data reading and decompressing procedure may be saved.

According to an embodiment, the first virtual file system layer 32 or the second virtual file system layer 34 may additionally read data which is adjacent to data requested from an upper layer and may perform a read-ahead to store the read data in a buffer. According to an embodiment, the read-ahead may be only performed in one of the first virtual file system layer 32 and the second virtual file system layer 34. The read-ahead of the first virtual file system layer 32 and the second virtual file system layer 34 may be described with reference to FIG. 6.

According to an embodiment, the read-ahead may be performed (or, activated) in the first virtual file system layer 32. For example, if the first data 61 of 512 KB is requested from the application program layer 31, the first virtual file system layer 32 may request second data 63 of 512 KB as well as the first data 61 of 512 KB from the compressed file system layer 33. Accordingly, the compressed file system layer 33 may identify that the first data 61 and the second data 63 are respectively compressed to 384 KB and 296 KB and may request the second virtual file system layer 34 to read data of total 680 KB. The compressed file system layer 33 may decompress the data of 680 KB read to the second virtual file system layer 34, may cache the uncompressed data in the fourth buffer 124, and may transmit the uncompressed data to the first virtual file system layer 32. That is, if the read-ahead is performed at the first virtual file system layer 32, decompression may be performed with respect to data, which the application program layer 31 requests, and data that is adjacent to the requested data and thus the data may be prepared in the first virtual file system layer 32.

Figure 7:
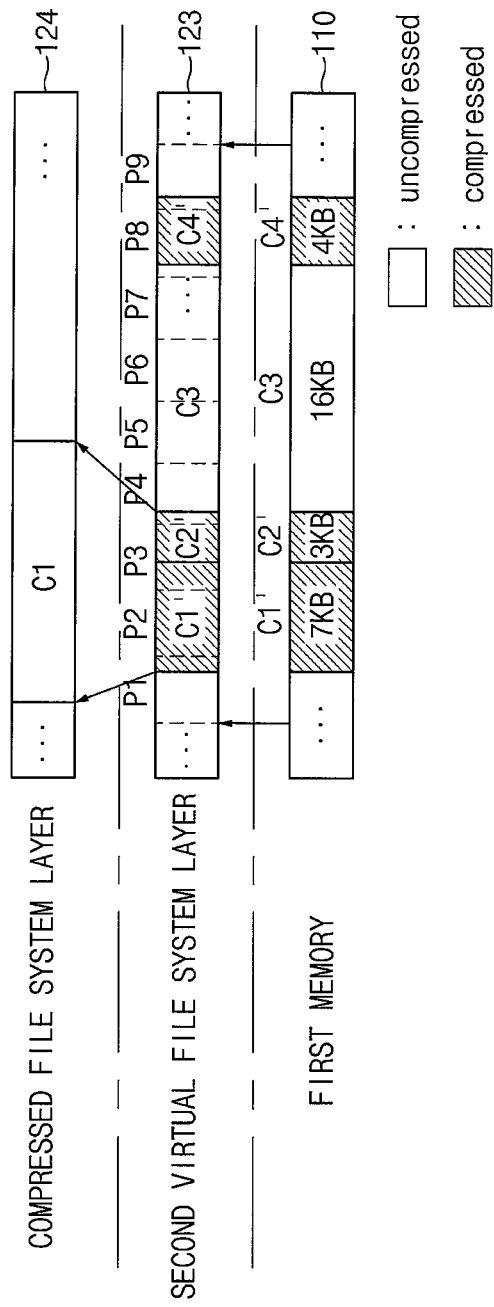
FIG. 7 is a block diagram illustrating a buffer managing method according to various embodiments of the present disclosure.

According to an embodiment, the read-ahead may be performed (or, activated) in the second virtual file system layer 34. For example, if the compressed file system layer 33 is requested to read the first data compressed to 384 KB, the second virtual file system layer 34 may access the first memory 110 and may additionally read data of 384 KB, which is adjacent to the first data compressed, as well as the first data, which is compressed to 384 KB, to the third buffer 123. According to an embodiment, additionally, the compressed file system layer 33 may decompress data (i.e., 2*384 KB) cached in the third buffer 123 and may cache original data, which is decompressed, in the fourth buffer 124. FIG. 7 is a block diagram illustrating a buffer managing method according to various embodiments of the present disclosure.

In a buffer managing method illustrated in FIG. 7, the case that to read data stored in the first memory 110 based on a file writing operation described with reference to FIG. 4 is described as an example. According to an embodiment, the second virtual file system layer 34 may allocate nine pages P1 to P9 in the third buffer 123 based on the request of the compressed file system layer 33, may access the first memory 110, and may read data to the third buffer 123. If data is read to the third buffer 123, the compressed file system layer 33 may decompress data, which is cached in the third buffer 123, by a cluster unit and may cache the uncompressed data in the fourth buffer 124. According to an embodiment, if all data included in the first data unit (e.g., page unit) of the third buffer 123 is decompressed, the controller 130 (or memory management included in the controller 130) may set a memory area, in which a corresponding data unit is occupied in the third buffer 123, to an inactive area or a free area. For example, if the compressed file system layer 33 decompresses the first compressed cluster C1', all data included in the second page P2 of the third buffer 123 may be decompressed. Accordingly, the controller 130 may set the second page P2 of the third buffer 123 to an inactive area or a free area. Afterwards, if the compressed file system layer 33 decompresses the second compressed cluster C2', all data C1' and C2' included in the third page P3 of the third buffer 123 may be decompressed. Accordingly, the controller 130 may set the third page P3 of the third buffer 123 to an inactive area or a free area.

Figure 8:
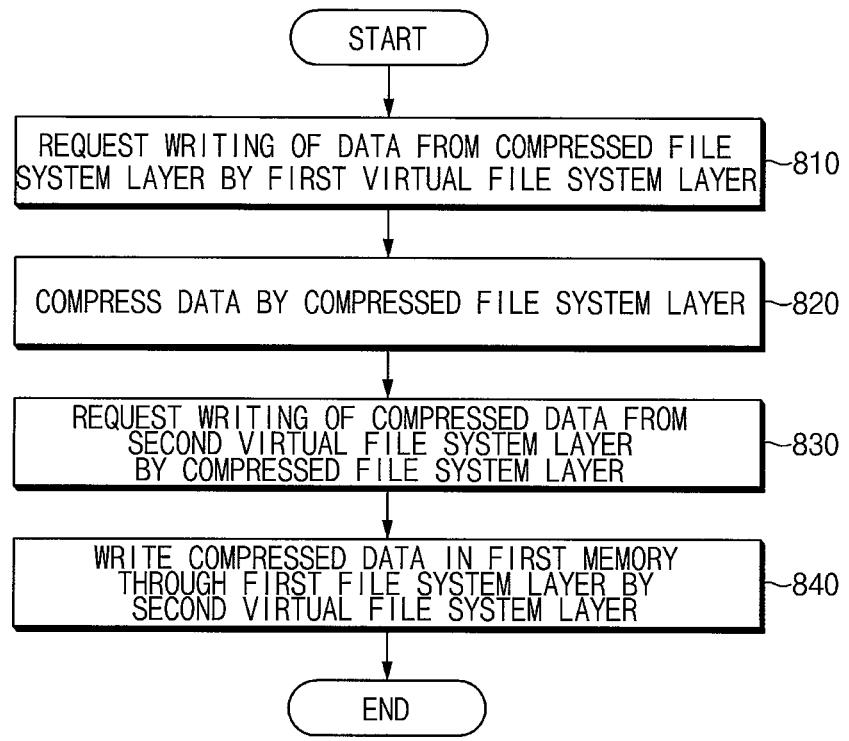
FIG. 8 is a flow chart illustrating a file write method of an electronic device according to various embodiments of the present disclosure.

FIG. 8 is a flow chart illustrating a file write method of an electronic device according to various embodiments of the present disclosure. A flow chart illustrated in FIG. 8 may include operations that the electronic device 100 illustrated in FIG. 1 processes. Even though omitted below, details about the electronic device 100 described with reference to FIGS. 1 to 7 may be applied to the flowchart illustrated in FIG. 8.

Referring to FIG. 8, in operation 810, the first virtual file system layer 32 may request the compressed file system layer 33 to write data. According to an embodiment, the first virtual file system layer 32 may request the first buffer 121 to write data based on the request of the application program layer 31. According to an embodiment, the first virtual file system layer 32 may cache data, which the application program layer 31 requests the first virtual file system layer 32 to write, in the first buffer 121. According to an embodiment, the first virtual file system layer 32 may manage data in the first buffer 121 by the first unit (e.g., page unit) and may read and write the data. According to an embodiment, the first virtual file system layer 32 may request the compressed file system layer 33 to write the data cached in the first buffer 121.

According to an embodiment, in operation 820, the compressed file system layer 33 may compress data that the first virtual file system layer 32 requests the compressed file system layer 33 to write. According to an embodiment, the compressed file system layer 33 may read (i.e., use or copy) data, which is cached in the first buffer 121, into the second buffer 122 based on the request of the first virtual file system layer 32. According to an embodiment, the compressed file system layer 33 may manage data of the second buffer 121 by the first unit (e.g., page unit) and may read and write the data.

According to an embodiment, the compressed file system layer 33 may compress data of the second buffer 122. Accordingly, the compressed file system layer 33 may compress data of the second buffer 122 by the second data unit (e.g., cluster unit) being a multiple (e.g., once or four times) of the first data unit.

According to an embodiment, the compressed file system layer 33 may generate and manage information (or compressed cluster information) about compressed data. According to an embodiment, cluster information may be generated by each cluster. According to an embodiment, the compressed file system layer 33 may generate and manage information (or compressed file information) about a compressed file.

According to an embodiment, in operation 830, the compressed file system layer 33 may request the second virtual file system layer 34 to write the compress data. According to an embodiment, the compressed file system layer 33 may request the second virtual file system layer 34 to write the compressed data cached in the second buffer 122. According to an embodiment, the compressed file system layer 33 may request the second virtual file system layer 34 to write compressed cluster information and compressed file information, which are generated in a compression process.

According to an embodiment, in operation 840, the second virtual file system layer 34 may write the compressed data in the first memory 110 through the first file system layer 35. According to an embodiment, the second virtual file system layer 34 may copy the compressed data, which is cached in the second buffer 122, into the third buffer 123. According to an embodiment, the second virtual file system layer 34 may request the first file system layer 35 to write data cached in the third buffer 123. The first file system layer 35 may write data, which is requested through the block layer 37, in the first memory 110.

Figure 9:
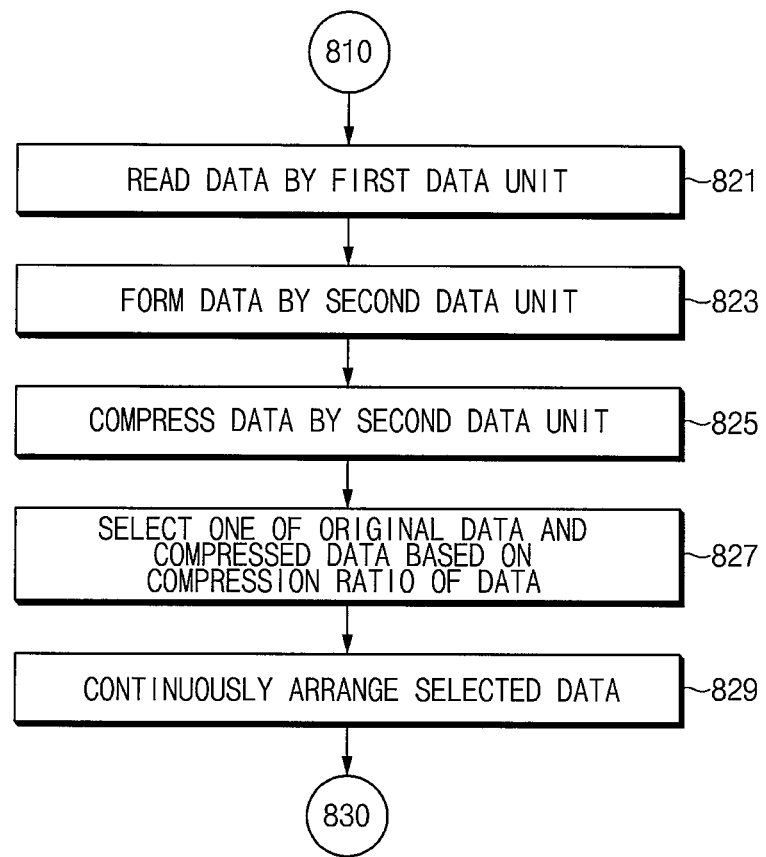
FIG. 9 is a flow chart illustrating a file write method of an electronic device according to various embodiments of the present disclosure.

FIG. 9 is a flow chart illustrating a file write method of an electronic device according to various embodiments of the present disclosure. The flow chart illustrated in FIG. 9 is a diagram illustrating a specific example of operation 820 illustrated in FIG. 8.

Referring to FIG. 9, in operation 810, if the first virtual file system layer 32 is requested to write data, the compressed file system layer 33 may read (i.e., use or copy) data in a memory space managed by the first data unit in operation 821. For example, the compressed file system layer 33 may copy data, which is cached in the first buffer 121, into the second buffer 122 by the first data unit (e.g., 4 KB) based on the write request of the first virtual file system layer 32. According to an embodiment, when the data cached in the first buffer 121 is copied into the second buffer 122, the compressed file system layer 33 may allow the requested data to be stored in the second buffer 122 by the second data unit. For example, data managed by the first virtual file system layer 32 on the first buffer 121 by the first data unit (e.g., page unit) may not be stored in a continuous page in a memory space of the first buffer 121, and the compressed file system layer 33 may continuously copy data, which is discontinuously stored in the first buffer 121, into the second buffer 122 and may allow the data to be stored in the second buffer 122 by the second data unit.

According to an embodiment, in operation 823, the compressed file system layer 33 may form data so as to store data, which is read to the second buffer 122, by the second data unit (e.g., 16 KB). According to an embodiment, in operation 821, in the case where data, which is copied into the second buffer 122, is previously stored in the second buffer 122 by the second data unit, operation 823 may be omitted.

According to an embodiment, in operation 825, the compressed file system layer 33 may compress data by the second data unit. According to an embodiment, compressed data may be stored in the second buffer 122 independent of original data.

According to an embodiment, in operation 827, the compressed file system layer 33 may select one of the original data and the compressed data based on the compression ratio of data. For example, if a compression ratio of data is smaller than or equal to a designated ratio (e.g., 50%), the compressed file system layer 33 may select original data that is decompressed.

According to an embodiment, in operation 829, the compressed file system layer 33 may continuously arrange the selected data. For example, in operation 827, the compressed file system layer 33 may continuously arrange the selected data so as to correspond with an input/output unit of the first memory 110. According to an embodiment, operation 827 may be omitted.

In operation 830, the compressed file system layer 33 may request the second virtual file system layer 34 to write the compressed data (original data may be included according to compression ratio). According to an embodiment, the compressed file system layer 33 may request the second virtual file system layer 34 to write the data continuously arranged in the second buffer 122. For another example, in the case where operation 827 is omitted, the compressed file system layer 33 may request the second virtual file system layer 34 to write the data selected according to compression ratio.

Figure 10:
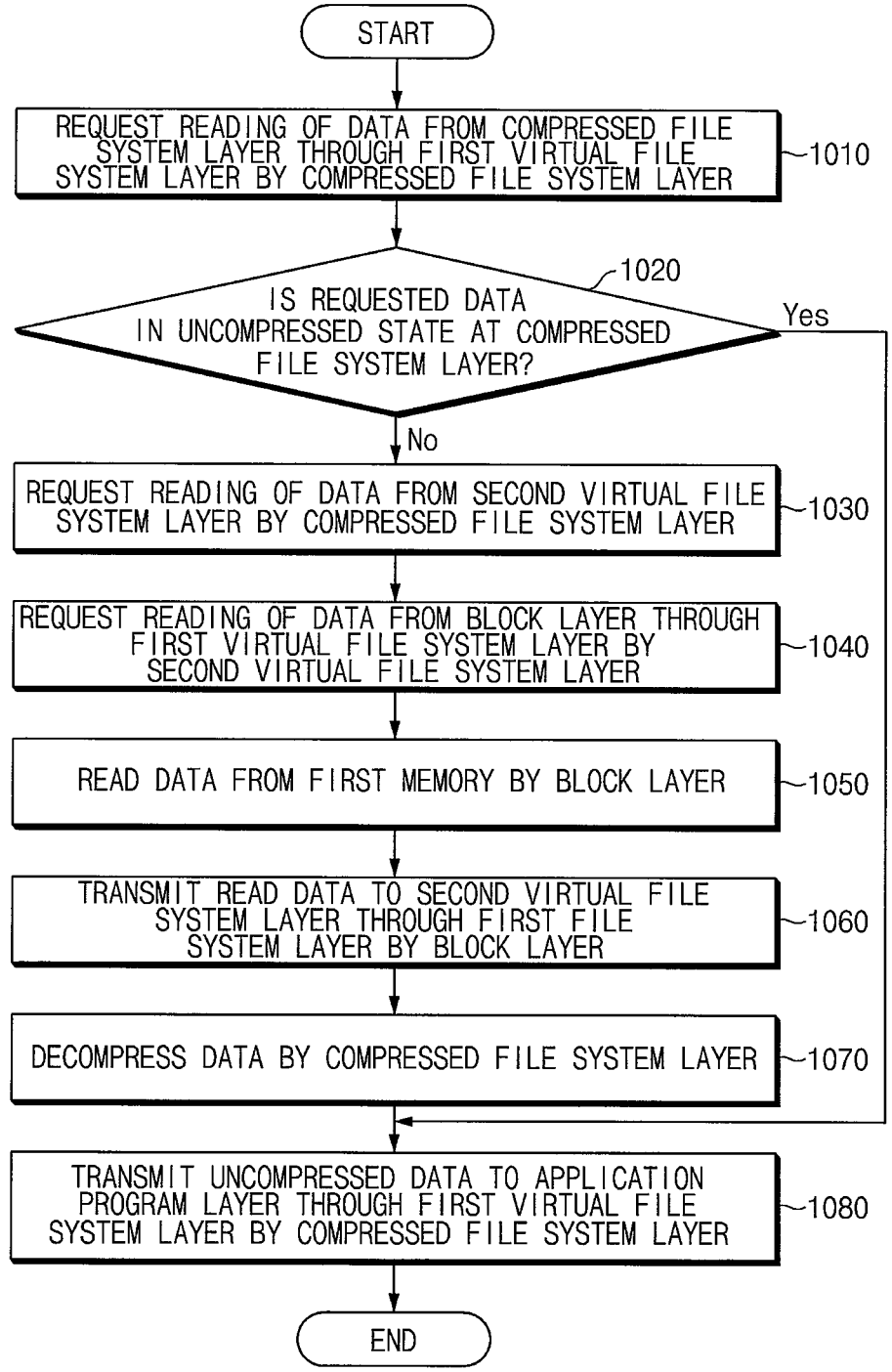
FIG. 10 is a flow chart illustrating a file read method of an electronic device according to various embodiments of the present disclosure.

FIG. 10 is a flow chart illustrating a file read method of an electronic device according to various embodiments of the present disclosure.

Referring to FIG. 10, in operation 1010, the application program layer 31 may request the compressed file system layer 33 to read data through the first virtual file system layer 32. For example, the application program layer 31 may request the first virtual file system layer 32 to read the data. Accordingly, the first virtual file system layer 32 may request the compressed file system layer 33 to read the data. According to an embodiment, the first virtual file system layer 32 may allocate a memory page about data, which the application program layer 31 requests, in the first buffer 121 and may request the compressed file system layer 33 to read data.

According to an embodiment, in operation 1020, the compressed file system layer 33 may identify whether requested data is in an uncompressed state in the compressed file system layer 33. For example, the compressed file system layer 33 may identify whether the requested data is cached in the fourth buffer 124. According to an embodiment, the compressed file system layer 33 may identify whether the requested data is included in a certain compressed cluster and may identify whether an uncompressed cluster is cached in the fourth buffer 124.

According to an embodiment, if the requested data is in a compressed state, in operation 1080, the compressed file system layer 33 may transmit the requested data to the application program layer 31 through the first virtual file system layer 32. For example, the compressed file system layer 33 may copy requested data into a memory page allocated in the first buffer 121 and may transmit data that is requested from the first virtual file system layer 32. The first virtual file system layer 32 may transmit (or copy) data, which the application program layer 31 requests, from among data cached in the first buffer 121 to the application program layer 31.

According to an embodiment, if the requested data is not cached in the fourth buffer 124, in operation 1030, the compressed file system layer 33 may request the second file system layer 36 to read the data. According to an embodiment, the compressed file system layer 33 may identify a position and size of a cluster associated with data requested using the compressed cluster information and may request the second virtual file system layer 34 to read corresponding data.

According to an embodiment, in operation 1040, the second virtual file system layer 34 may request the block layer 37 to read the data through the first file system layer 35. According to an embodiment, the second virtual file system layer 34 may allocate a memory page about data requested from the third buffer 123 and may request the first file system layer 35 to read the data. The first file system layer 35 may request the block layer 37 to read the data based on the request of the second virtual file system layer 34.

According to an embodiment, in operation 1050, the block layer 37 may read data requested from the first memory 110. For example, the block layer 37 may access the first memory 110 and may copy the requested data into the fifth buffer 125.

According to an embodiment, in operation 1060, the block layer 37 may transmit the read data to the second virtual file system layer 34 through the first file system layer 35. For example, the block layer 37 may copy data stored in the fifth buffer 125 into a memory page allocated in the first file system layer 35 being an upper layer. According to an embodiment, before the data is completely read from the first memory 110, the block layer 37 may transmit the read data to the first file system layer 35. For example, the DMA controller 133 may generate an interrupt whenever data of a unit (e.g., block unit) designated in the fifth buffer 125 is completely read, and the block layer 37 may transmit the data read to the fifth buffer 125 to the first file system layer 35 in compliance with the interrupt. Accordingly, the first file system layer 35 may transmit the data read from the block layer 37 to the third buffer 123 of the second virtual file system layer 34 being an upper layer.

According to an embodiment, in operation 1070, the compressed file system layer 33 may decompress data. According to an embodiment, the compressed file system layer 33 may decompress the data stored in the third buffer 123. According to an embodiment, the compressed file system layer 33 may cache the uncompressed data in the fourth buffer 124. According to an embodiment, before the copying of all data, which an application program layer 31 requests, into the third buffer 123, the compressed file system layer 33 may begin to decompress the data stored in the third buffer 123. For example, if data of a designated size (e.g., one compressed cluster) is copied into the third buffer 123, the compressed file system layer 33 may decompress corresponding data. Accordingly, before the block layer 37 completely reads all data that an application program layer 31 requests, the compressed file system layer 33 may begin to decompress the data.

According to an embodiment, in operation 1080, the compressed file system layer 33 may transmit the uncompressed data to the application program layer 31 through the first virtual file system layer 32. For example, the compressed file system layer 33 may copy requested data into a memory page allocated in the first buffer 121 and may transmit data that is requested from the first virtual file system layer 32. The first virtual file system layer 32 may transmit (or copy) data, which the application program layer 31 requests, from among data cached in the first buffer 121 to the application program layer 31.

Figure 11:
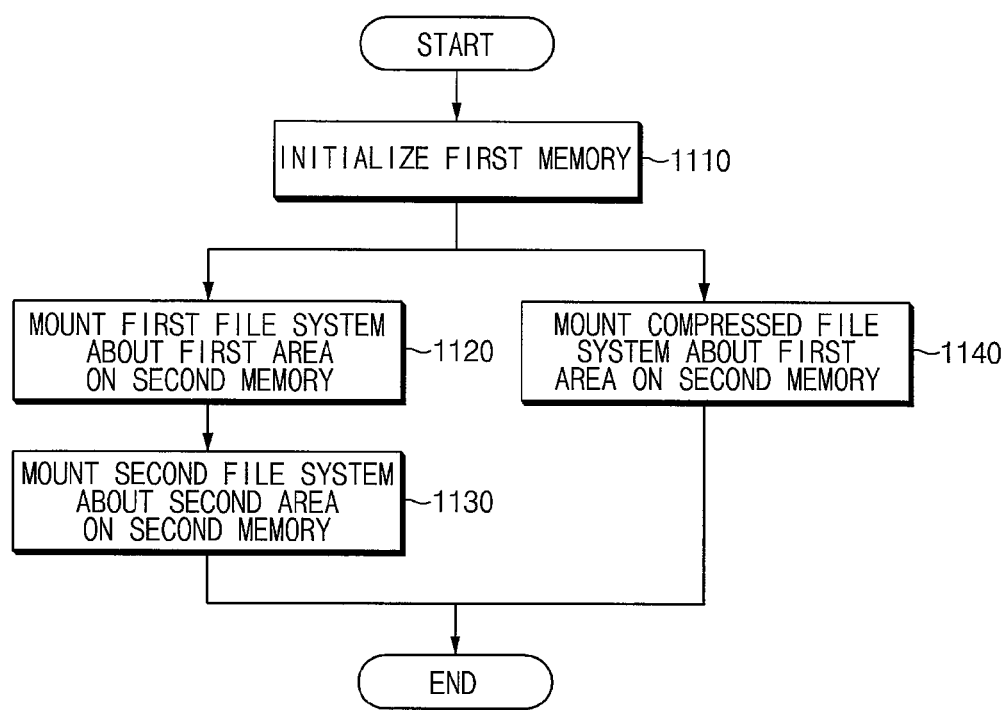
FIG. 11 is a flow chart illustrating a file system mounting method of an electronic device according to various embodiments of the present disclosure.

FIG. 11 is a flow chart illustrating a file system mounting method of an electronic device according to various embodiments of the present disclosure.

Referring to FIG. 11, in operation 1110, the electronic device 100 may initialize the first memory 110. According to an embodiment, if the electronic device 100 is booted, the electronic device 100 may initialize the first memory 110.

According to an embodiment, if the first memory 110 is initialized, in operation 1120, the electronic device 100 may mount the first file system about a first area of the first memory 110 on the second memory 120. The mounting of a file system may mean an operation to load metadata, which is stored in the first memory 110, of the file system and to build a path that is accessed to the first memory 110 or a layer structure of the file system.

Moreover, the controller 100 may again mount a compressed file system about the area of the first memory 110 on the second memory 120. That is, the compressed file system may be designed as a stackable file system.

According to an embodiment, if the first memory 110 is initialized, in operation 1140, the electronic device 100 may mount the second file system about the second area of the first memory 110 on the second memory 120.

According to an embodiment, the first area may be an area corresponding to the first partition of the first memory 110 and the second area may be an area corresponding to the second partition of the first memory 110. That is, the electronic device 100 may mount a file system by a partition included in the first memory 110, on the second memory 120. For example, the electronic device 100 may sequentially mount the first file system and the compressed file system about the first partition of the first memory 110 on the second memory 120 and may mount the second file system about the second partition of the first memory 110 on the second memory 120.

Figure 12:
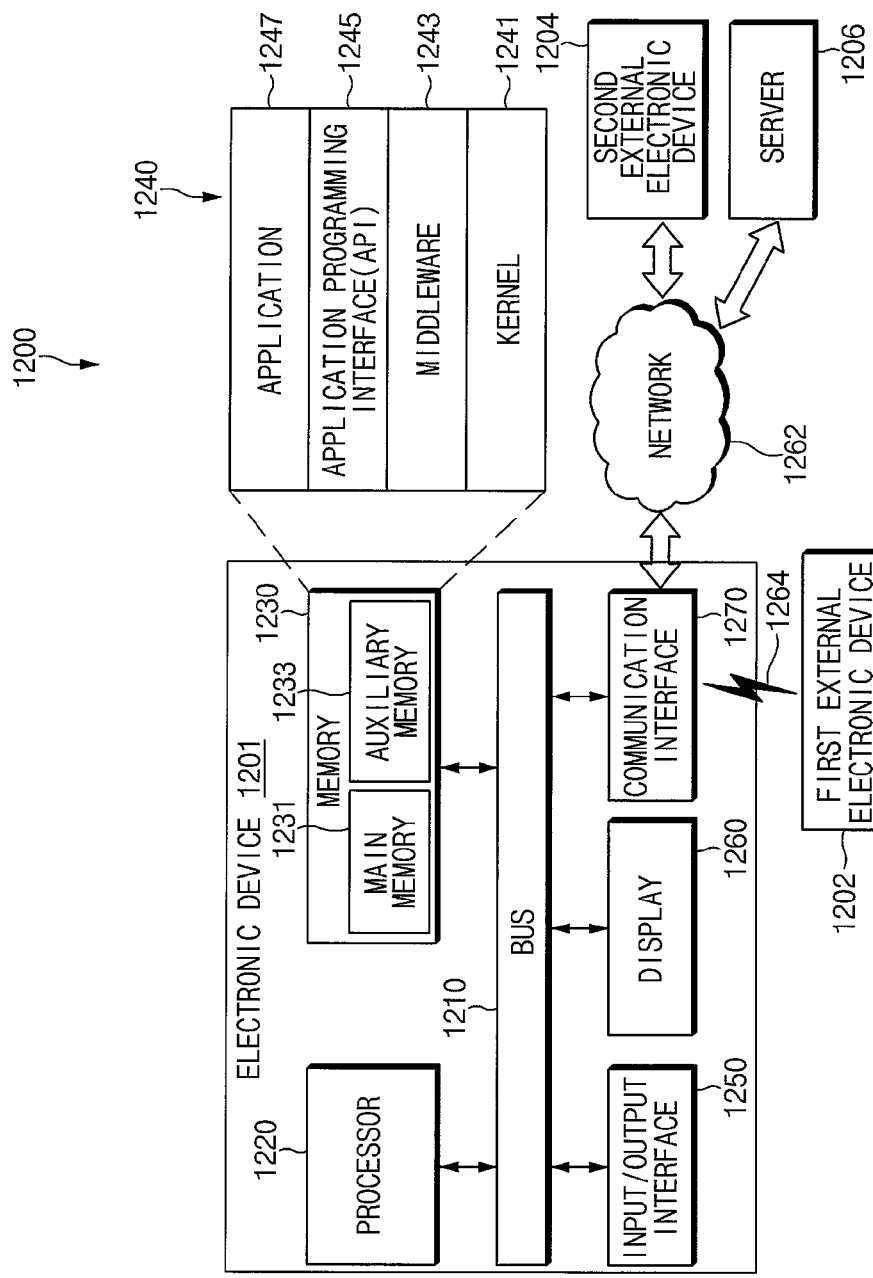
FIG. 12 is a block diagram of an electronic device in a network environment according to various embodiments of the present disclosure.

FIG. 12 is a block diagram of an electronic device in a network environment according to various embodiments of the present disclosure.

Referring to FIG. 12, there is described an electronic device 1201 in a network environment 1200 according to various embodiments. Referring to FIG. 11, an electronic device 1201 may include, for example, all or a part of an electronic device 100 illustrated in FIG. 1. The electronic device 1201 may include a bus 1210, a processor 1220, a memory 1230, an input/output (I/O) interface 1250, a display 1260, and a communication interface 1270. According to an embodiment, the electronic device 1201 may not include at least one of the above-described components or may further include other component(s).

For example, the bus 1210 may interconnect the above-described components 1210 to 1270 and may include a circuit for conveying communications (e.g., a control message and/or data) among the above-described components.

The processor 1220 may include one or more of a central processing unit (CPU), an application processor (AP), or a communication processor (CP). The processor 1220 may perform, for example, data processing or an operation associated with control or communication of at least one other component(s) of the electronic device 1201.

The memory 1230 may include a volatile and/or nonvolatile memory. For example, the memory 1230 may store instructions or data associated with at least one other component(s) of the electronic device 1201. According to an embodiment, the memory 1230 may store software and/or a program 1240.

According to an embodiment, the memory 1230 may include a main memory 1231 and an auxiliary memory 1233. For example, when the processor 1270 executes a program, the main memory 1231 may store the program and data, which is processed by the program. For example, the auxiliary memory 1233 may be a storage that supplements a limited memory capacity of the main memory 1231, and may store a large amount of program (or data). According to an embodiment, in the case where the processor 1270 executes a specific program (or data) stored in the auxiliary memory 1233, the specific program may be loaded from the auxiliary memory 1233 to the main memory 1231. According to an embodiment, the main memory 1231 and the auxiliary memory 1233 may transmit or receive data between each other using a direct memory access (DMA) method without control of the processor 1270.

The program 1240 may include, for example, a kernel 1241, a middleware 1243, an application programming interface (API) 1245, and/or an application program (or an application) 1247. At least a portion of the kernel 1241, the middleware 1243, or the API 1245 may be called an "operating system (OS)".

For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete components of the electronic device 1201 so as to control or manage system resources.

The middleware 1243 may perform, for example, a mediation role such that the API 1245 or the application program 1247 communicates with the kernel 1241 to exchange data. Furthermore, the middleware 1243 may process one or more task requests received from the application program 1247 according to a priority. For example, the middleware 1243 may assign the priority, which makes the middleware 1243 possible to use a system resource (e.g., the bus 1210, the processor 1220, the memory 1230, or the like) of the electronic device 1201, to at least one of the application program 1247 and may process the task requests.

The API 1245 may be an interface through which the application program 1247 controls a function provided by the kernel 1241 or the middleware 1243, and may include, for example, at least one interface or function (e.g., an instruction) for a file control, a window control, image processing, a character control, or the like.

The I/O interface 1250 may transmit an instruction or data, input from a user or another external device, to other component(s) of the electronic device 1201. Furthermore, the I/O interface 1250 may output an instruction or data, received from other component(s) of the electronic device 1201, to a user or another external device.

The display 1260 may include, for example, a liquid crystal display (LCD), a light-emitting diode (LED) display, an organic LED (OLED) display, or a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a portion of a user's body.

The communication interface 1270 may establish communication between the electronic device 1201 and an external electronic device (e.g., a first external electronic device 1202, a second external electronic device 1204, or a server 1206). For example, the communication interface 1270 may be connected to a network 1262 through wireless communication or wired communication to communicate with an external device (e.g., a second external electronic device 1204 or a server 1206).

The wireless communication may include at least one of, for example, long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM), or the like, as cellular communication protocol. Furthermore, the wireless communication may include, for example, a local area network 1264. The local area network 1264 may include at least one of a wireless fidelity (Wi-Fi), a bluetooth, a bluetooth low energy (BLE), a Zigbee, a near field communication (NFC), a magnetic secure transmission, or a global navigation satellite system (GNSS). The GNSS may include at least one of a global positioning system (GPS), a global navigation satellite system (Glonass), Beidou Navigation Satellite System (hereinafter referred to as "Beidou") or Galileo, the European global satellite-based navigation system, or the like. In this specification, "GPS" and "GNSS" may be interchangeably used.

The wired communication may include at least one of, for example, a universal serial bus (USB), a high definition multimedia interface (HDMI), a recommended standard-232 (RS-232), a power line communication, or a plain old telephone service (POTS). The network 1262 may include at least one of telecommunications networks, for example, a computer network (e.g., LAN or WAN), an Internet, or a telephone network.

Each of the first and second external electronic devices 1202 and 1204 may be a device of which the type is different from or the same as that of the electronic device 1201. According to an embodiment, the server 1206 may include a group of one or more servers. According to various embodiments, all or a part of operations that the electronic device 1201 will perform may be executed by another or a plurality of electronic devices (e.g., the first and second electronic devices 1202 and 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 701 at other device (e.g., the electronic device 1202 or 1204 or the server 1206). The other electronic device (e.g., the first or second external electronic device 1202 or 1204 or the server 1206) may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
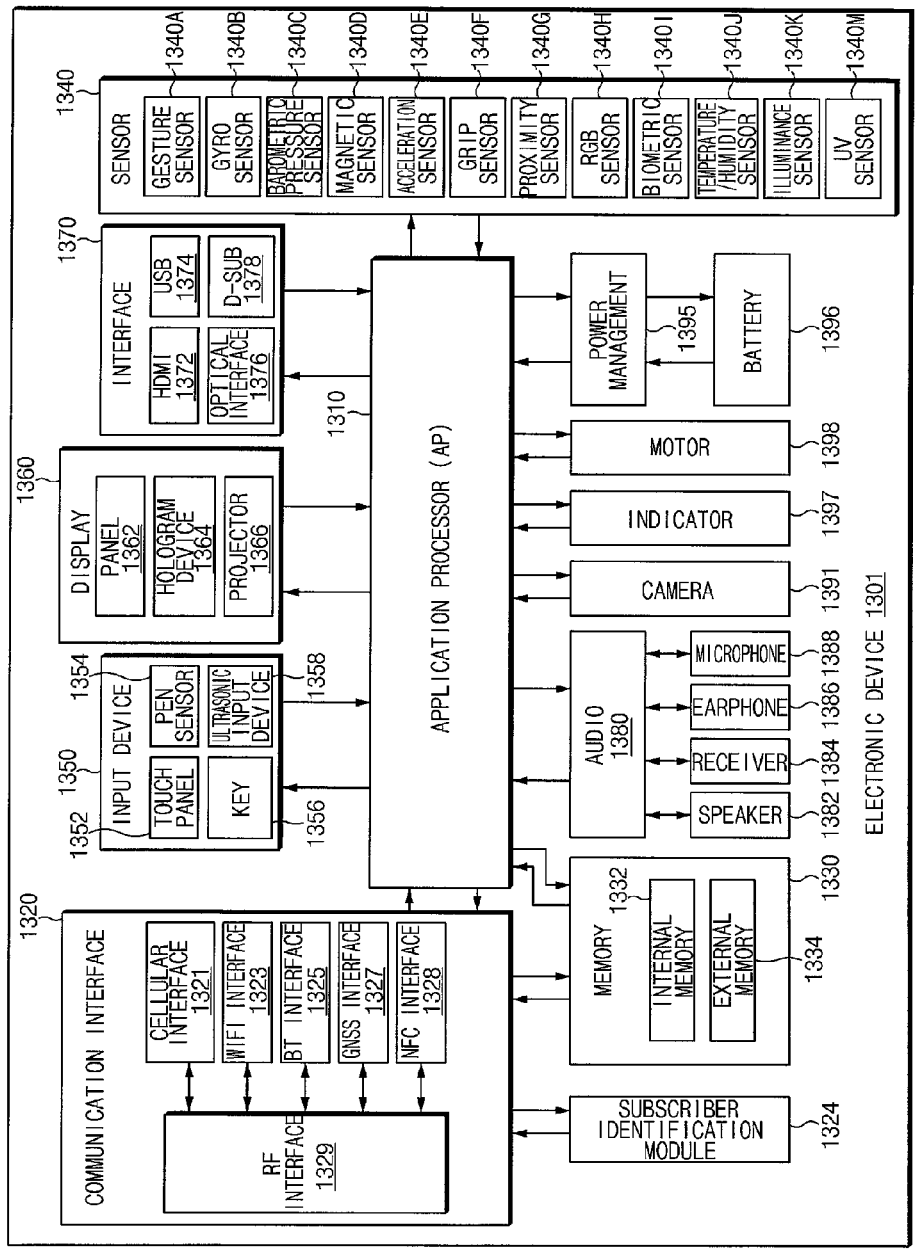
FIG. 13 is a block diagram illustrating an electronic device 1301 according to various embodiments.

FIG. 13 is a block diagram illustrating an electronic device 1301 according to various embodiments. The electronic device 1301 may include, for example, all or a part of an electronic device 100 illustrated in FIG. 1. The electronic device 1301 may include one or more processors (e.g., an application processor) 1310, a communication module 1320, a subscriber identification module 1324, a memory 1330, a sensor 1340, an input device 1350, a display 1360, an interface 1370, an audio 1380, a camera 1391, a power management 1395, a battery 1396, an indicator 1397, and a motor 1398.

The processor 1310 may drive an operating system (OS) or an application to control a plurality of hardware or software components connected to the processor 1310 and may process and compute a variety of data. The processor 1310 may be implemented with a System on Chip (SoC), for example. According to an embodiment, the processor 1310 may further include a graphic processing unit (GPU) and/or an image signal processor. The processor 1310 may include at least a part (e.g., a cellular interface 1321) of components illustrated in FIG. 13. The processor 1310 may load and process an instruction or data, which is received from at least one of other components (e.g., a nonvolatile memory), and may store a variety of data at a nonvolatile memory.

The communication module 1320 may be configured the same as or similar to a communication interface 1270 of FIG. 12. The communication module 1320 may include a cellular interface 1321, a Wi-Fi interface 1323, a Bluetooth (BT) interface 1325, a GNSS interface 1327 (e.g., a GPS module, a Glonass module, Beidou module, or a Galileo module), a near field communication (NFC) interface 1328, and a radio frequency (RF) module 1329.

The cellular interface 1321 may provide voice communication, video communication, a character service, an Internet service or the like through a communication network. According to an embodiment of the present disclosure, the cellular interface 1321 may perform discrimination and authentication of the electronic device 1301 within a communication network using a subscriber identification module 1324 (e.g., a SIM card), for example. According to an embodiment, the cellular interface 1321 may perform at least a portion of functions that the processor 1310 provides. According to an embodiment, the cellular interface 1321 may include a communication processor (CP).

According to an embodiment, at least a portion (e.g., two or more components) of the cellular interface 1321, the Wi-Fi interface 1323, the BT interface 1325, the GNSS interface 1327, and the NFC interface 1328 may be included within one Integrated Circuit (IC) or an IC package.

The RF 1329 may transmit and receive a communication signal (e.g., an RF signal). The RF 1329 may include a transceiver, a power amplifier module (PAM), a frequency filter, a low noise amplifier (LNA), an antenna, or the like. According to various embodiments, at least one of the cellular interface 1321, the Wi-Fi interface 1323, the BT interface 1325, the GNSS interface 1327, or the NFC interface 1328 may transmit and receive an RF signal through a separate RF.

The subscriber identification module 1324 may include, for example, a subscriber identification module and may include unique identify information (e.g., integrated circuit card identifier (ICCID)) or subscriber information (e.g., integrated mobile subscriber identity (IMSI)).

The memory 1330 (e.g., the first memory 110) may include an internal memory 1332 or an external memory 1334. For example, the internal memory 1332 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1334 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1334 may be functionally and/or physically connected to the electronic device 1301 through various interfaces.

The sensor 1340 may measure, for example, a physical quantity or may detect an operation state of the electronic device 1301. The sensor 1340 may convert the measured or detected information to an electric signal. The sensor 1340 may include at least one of a gesture sensor 1340A, a gyro sensor 1340B, a pressure sensor 1340C, a magnetic sensor 1340D, an acceleration sensor 1340E, a grip sensor 1340F, a proximity sensor 1340G, a color sensor 1340H (e.g., red, green, blue (RGB) sensor), a living body sensor 1340I, a temperature/humidity sensor 1340I, an illuminance sensor 1340K, or an UV sensor 1340M. Additionally or alternatively, the sensor 1340 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor 1340 may further include a control circuit for controlling at least one or more sensors included therein. According to an embodiment of the present disclosure, the electronic device 1301 may further include a processor which is a part of the processor 1310 or independent of the processor 1310 and is configured to control the sensor 1340. The processor may control the sensor 1340 while the processor 1310 remains at a sleep state.

The input device 1350 may include, for example, a touch panel 1352, a (digital) pen sensor 1354, a key 1356, or an ultrasonic input unit 1358. The touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, a keypad, and the like. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 140 illustrated in FIG. 1) may include a panel 1362, a hologram device 1364, and/or a projector 1366. The panel 1362 may be implemented to be flexible, transparent or wearable, for example. The panel 1362 and the touch panel 1352 may be integrated into a single module. The hologram device 1364 may display a stereoscopic image in a space using a light interference phenomenon. The projector 1366 may project light onto a screen so as to display an image. The screen may be arranged in the inside or the outside of the electronic device 1301. According to an embodiment, the display 1360 may further include a control circuit for controlling the panel 1362, the hologram device 1364, or the projector 1366.

The interface 1370 may include, for example, an HDMI (high-definition multimedia interface) 1372, a USB (universal serial bus) 1374, an optical interface 1376, or a D-sub (D-subminiature) 1378. The interface 1370 may be included, for example, in a communication interface 1270 illustrated in FIG. 12. Additionally or alternatively, the interface 1370 may include, for example, a mobile high definition link (MHL) interface, a SD card/multi-media card (MMC) interface, or an infrared data association (IrDA) standard interface.

The audio 1380 may convert a sound and an electric signal in dual directions. At least a portion of the audio 1380 may be included, for example, in the input module 150 illustrated in FIG. 1. The audio 1380 may process, for example, sound information that is input or output through a speaker 1382, a receiver 1384, an earphone 1386, or a microphone 1388.

The camera 1391 for shooting a still image or a video may include, for example, at least one image sensor (e.g., a front sensor or a rear sensor), a lens, an image signal processor (ISP), or a flash (e.g., an LED or a xenon lamp).

The power management 1395 may manage, for example, power of the electronic device 1301. According to an embodiment of the present disclosure, the power management 1395 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1396 and a voltage, current or temperature thereof while the battery is charged. The battery 1396 may include, for example, a rechargeable battery or a solar battery.

The indicator 1397 may display a specific state of the electronic device 1301 or a portion thereof (e.g., a processor 1310), such as a booting state, a message state, a charging state, and the like. The motor 1398 may convert an electrical signal into a mechanical vibration and may generate the following effects: vibration, haptic, and the like. Even though not illustrated, a processing device (e.g., a GPU) for supporting a mobile TV may be included in the electronic device 1301. The processing device for supporting a mobile TV may process media data according to the standards of DMB, digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. According to various embodiments, the electronic device may exclude some elements or may further include other additional elements. Furthermore, some of the elements of the electronic device according to various embodiments may be combined with each other so as to form one entity, so that the functions of the elements may be performed in the same manner as before the combination.

Figure 14:
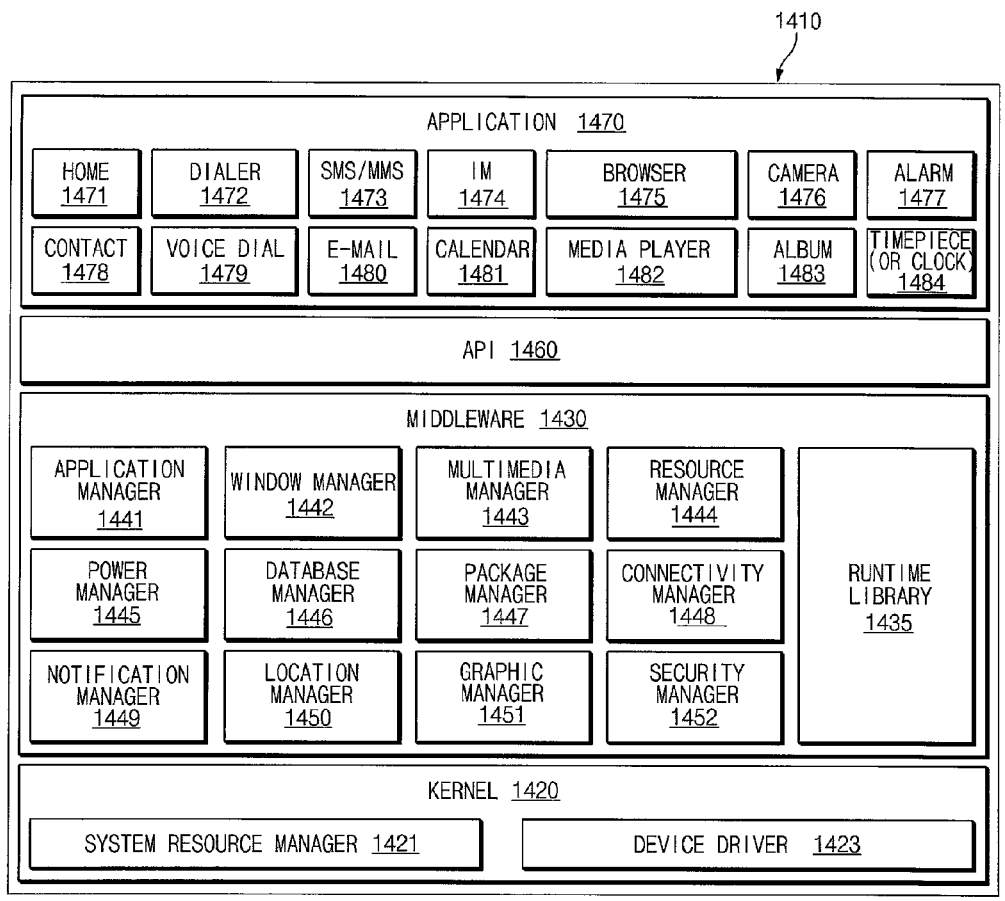
FIG. 14 is a block diagram illustrating a program module according to various embodiments.

FIG. 14 is a block diagram illustrating a program module according to various embodiments.

According to an embodiment, a program module 1410 (e.g., a program 1240) may include an operating system (OS) to control resources associated with an electronic device (e.g., the electronic device 100), and/or diverse applications (e.g., the application program 1247) driven on the OS. The OS may be, for example, android, iOS, windows, symbian, tizen, or bada.

The program module 1410 may include, for example, a kernel 1420, a middleware 1430, an application programming interface (API) 1460, and/or an application 1470. At least a part of the program module 1410 may be preloaded on an electronic device or may be downloadable from an external electronic device (e.g., the first or second external electronic device 1202 or 1204, the server 1206, and the like).

The kernel 1420 (e.g., the kernel 1241) may include, for example, a system resource manager 1421 or a device driver 1423. The system resource manager 1421 may perform control, allocation, or retrieval of system resources. According to an embodiment of the present disclosure, the system resource manager 1421 may include a process managing part, a memory managing part, or a file system managing part. The device driver 1423 may include, for example, a display driver, a camera driver, a Bluetooth driver, a common memory driver, an USB driver, a keypad driver, a Wi-Fi driver, an audio driver, or an inter-process communication (IPC) driver.

The middleware 1430 may provide, for example, a function which the application 1470 needs in common, or may provide diverse functions to the application 1470 through the API 1460 to allow the application 1470 to efficiently use limited system resources of the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, or a security manager 1452.

The runtime library 1435 may include, for example, a library module which is used by a compiler to add a new function through a programming language while the application 1470 is being executed. The runtime library 1435 may perform input/output management, memory management, or capacities about arithmetic functions.

The application manager 1441 may manage, for example, a life cycle of at least one application of the application 1470. The window manager 1442 may manage a GUI resource which is used in a screen. The multimedia manager 1443 may identify a format necessary for playing diverse media files, and may perform encoding or decoding of media files by using a codec suitable for the format. The resource manager 1444 may manage resources such as a storage space, memory, or source code of at least one application of the application 1470.

The power manager 1445 may operate, for example, with a basic input/output system (BIOS) to manage a battery or power, and may provide power information for an operation of an electronic device. The database manager 1446 may generate, search for, or modify database which is to be used in at least one application of the application 1470. The package manager 1447 may install or update an application which is distributed in the form of package file.

The connectivity manager 1448 may manage, for example, wireless connection such as Wi-Fi or Bluetooth. The notification manager 1449 may display or notify an event such as arrival message, promise, or proximity notification in a mode that does not disturb a user. The location manager 1450 may manage location information of an electronic device. The graphic manager 1451 may manage a graphic effect that is provided to a user, or manage a user interface relevant thereto. The security manager 1452 may provide a general security function necessary for system security or user authentication. According to an embodiment of the present disclosure, in the case where an electronic device (e.g., the electronic device 100) includes a telephony function, the middleware 1430 may further includes a telephony manager for managing a voice or video call function of the electronic device.

The middleware 1430 may include a middleware module that combines diverse functions of the above-described components. The middleware 1430 may provide a module specialized to each OS kind to provide differentiated functions. Additionally, the middleware 1430 may remove a part of the preexisting components, dynamically, or may add a new component thereto.

The API 1460 (e.g., the API 1245) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 1470 (e.g., the application program 1247) may include, for example, one or more applications capable of providing functions for a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, am album 1483, and a timepiece 1484, or for offering health care (e.g., measuring an exercise quantity or blood sugar) or environment information (e.g., atmospheric pressure, humidity, or temperature).

According to an embodiment, the application 1470 may include an application (hereinafter referred to as "information exchanging application" for descriptive convenience) to support information exchange between the electronic device (e.g., the electronic device 1201) and an external electronic device (e.g., the first or second electronic device 1202 or 1204). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., an electronic device 1202 or 1204). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 1202 or 1204 in FIG. 8) which communicates with the electronic device, an application running in the external electronic device, or a service (e.g., a call service, a message service, or the like) provided from the external electronic device.

According to an embodiment of the present disclosure, the application 1470 may include an application (e.g., a health care application of a mobile medical device, and the like) which is assigned in accordance with an attribute of the external electronic device (e.g., the electronic device 1202 or 1204). According to an embodiment, the application 1470 may include an application which is received from an external electronic device (e.g., the server 1206 or the external electronic device 1202 or 1204). According to an embodiment of the present disclosure, the application 1470 may include a preloaded application or a third party application which is downloadable from a server. The component titles of the program module 1410 according to the embodiment of the present disclosure may be modifiable depending on kinds of OSs.

According to various embodiments, at least a portion of the program module 1410 may be implemented by software, firmware, hardware, or a combination of two or more thereof. At least a portion of the program module 1410 may be implemented (e.g., executed), for example, by a processor (e.g., the processor 1310). At least a portion of the program module 1410 may include, for example, modules, programs, routines, sets of instructions, or processes, or the like for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. If the instructions are executed by a processor (e.g., a controller 130), the one or more processors may perform functions corresponding to the instructions. The computer-readable storage media, for example, may be the first memory 110.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments, and vice versa.

According to various embodiments of the present disclosure, in the case where a memory space of an electronic device is insufficient, it is possible to secure a memory space by compressing a part of the files saved in the electronic device. A file may be effectively managed by determining whether to compress the file based on the attributes of a file or the frequency of a file. Moreover, the insufficiency of a RAM space or the reduction of a processing speed occurring according to the compression or decompression of a file may be resolved.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An electronic device comprising:
   at least one first memory being nonvolatile; and
   a processor electrically connected to the at least one first memory, the processor configured to read a file from the first memory or to write a file on the first memory, wherein the at least one first memory is configured to store instructions, the instructions, when executed, cause the processor to provide a software layer structure comprising:
  a first virtual file system layer configured to interface with an application program layer;
  a compressed file system layer being a lower layer of the first virtual file system layer and configured to compress at least part of data of the written file or to decompress at least part of data of the read file;
  a second virtual file system layer being a lower layer of the compressed file system layer and configured to manage at least one of the written or read file; and
  a first file system layer being a lower layer of the second virtual file system layer and configured to read at least part of the read file from the at least one first memory or to write at least part of the written file on the at least one first memory, wherein each of the first virtual file system layer and the second virtual file system layer manages data by a first data unit, and wherein the compressed file system layer compresses data by a second data unit being a multiple of the first data unit.

2. The electronic device of claim 1, wherein the software layer structure further comprises a second file system layer being a lower layer of the first virtual file system layer and configured to access the at least one first memory and to read or write uncompressed data.

3. The electronic device of claim 2, wherein:
  the at least one first memory comprises a first partition and a second partition;
  the first file system layer accesses the first partition and reads or writes compressed data; and
  the second file system layer accesses the second partition and reads or writes the uncompressed data.

4. The electronic device of claim 3, wherein:
  the first partition is a partition in which a system file is stored; and
  the second partition is a partition in which a user file is stored.

5. The electronic device of claim 3, further comprising a display configured to provide a user interface a selection of whether to store a file in the first partition or in the second partition when the file is stored in the at least one first memory.

6. The electronic device of claim 1, further comprising:
  a second memory being volatile,
  wherein the at least one first memory is configured to store an instruction to cause the processor to:
    initialize the at least one first memory if the electronic device is booted;
    mount the first file system layer about at least part of an area of the at least one first memory on the second memory; and
    mount the compressed file system layer about the at least part of the area of the at least one first memory on the second memory.

7. The electronic device of claim 1, wherein the at least one first memory is configured to store an instruction to cause the processor to:
  identify a compression ratio of data compressed at the compressed file system layer; and
  write original data that is decompressed if the compression ratio is smaller than or equal to the designated ratio.

8. The electronic device of claim 1, further comprising:
  a second memory being volatile, wherein the second memory comprises:
    a first buffer configured to cache data managed at the first virtual file system layer;
    a second buffer configured to cache data managed at the compressed file system layer; and
    a third buffer configured to cache data managed at the second virtual file system layer.

9. The electronic device of claim 8, wherein the at least one first memory is configured to store an instruction to cause the processor to:
  cache data that is compressed at the compressed file system layer in the second buffer;
  continuously arrange the compressed data in a memory space on the second buffer; and
  transmit the compressed data to the third buffer.

10. The electronic device of claim 8, wherein the second memory further comprises a fourth buffer configured to cache data decompressed at the compressed file system layer when a file stored in the at least one first memory is read.

11. The electronic device of claim 8, wherein the at least one first memory stores an instruction instructing the processor to:
  manage data of the third buffer by a first data unit; and
  set a memory area of the third buffer, that a corresponding data unit occupies to an inactive area or a free area if all data included in the first data unit is decompressed.

12. The electronic device of claim 1, wherein the at least one first memory is configured to store an instruction to cause the processor to perform a read-ahead at one of the first and second virtual file system layers.

13. The electronic device of claim 1, further comprising:
  a second memory being volatile, and
  wherein the at least one first memory is configured to store an instruction to cause the processor to read a file, that is stored in the at least one first memory, to the second memory based on a request of the application program layer and the compressed file system layer to decompress the data read to the second memory before data that the application program layer requests all is completely read.

14. A method of operating an electronic device for writing a file, the method comprising:
  requesting a compressed file system layer to write data based on a file writing request of an application program layer, at a first virtual file system layer;
  compressing the data at the compressed file system layer;
  requesting a second virtual file system layer to write the compressed data at the compressed file system layer; and
  writing the compressed data in at least one first memory through a first file system layer at the second virtual file system layer, wherein each of the first virtual file system layer and the second virtual file system layer manages data by a first data unit, and wherein the compressed file system layer compresses data by a second data unit being a multiple of the first data unit.

15. The method of claim 14, wherein requesting the second virtual file system layer comprises:
  identifying a compression ratio of the compressed data; and
  requesting the first file system layer to write original data that is decompressed if the compression ratio is smaller than or equal to a designated ratio.

16. The method of claim 14, wherein requesting the second virtual file system layer further comprises:

arranging the compressed data so as to be continuously stored in a second buffer; and requesting the first file system layer to continuously write the data stored in the second buffer.

17. A method of operating an electronic device for reading a file, the method comprising:

requesting a compressed file system layer to read data through a first virtual file system layer at an application program layer;

requesting a second virtual file system layer to read the data at the compressed file system layer;

requesting a block layer to read the data through a first file system layer at the second virtual file system layer;

reading the data from at least one first memory at the block layer;

transmitting the read data to the second virtual file system layer through the first file system layer at the block layer;

decompressing the data transmitted to the second virtual file system layer at the compressed file system layer; and transmitting the decompressed data to the application program layer through the first virtual file system layer at the compressed file system layer, wherein each of the first virtual file system layer and the second virtual file system layer manages data by a first data unit, and wherein the compressed file system layer compresses data by a second data unit being a multiple of the first data unit.

18. The method of claim 17, wherein transmitting the read data comprises:

copying, at the block layer, the data into a third buffer by a first data unit; and setting a memory area of the third buffer, that a corresponding data unit occupies, to an inactive area or a free area if all data included in the first data unit is decompressed at the compressed file system layer.

19. The method of claim 17, further comprising:

caching uncompressed data in a fourth buffer at the compressed file system layer;

identifying whether data that the compressed file system layer requests is in the fourth buffer at the compressed file system layer if the application program layer is requested to read the data; and transmitting the data, that is cached in the fourth buffer, to the application program layer through the first virtual file system layer at the compressed file system layer if the data that the application program layer requests is in the fourth buffer.

* * * * *